(12) United States Patent
Pitwon

(10) Patent No.: US 8,649,645 B2
(45) Date of Patent: Feb. 11, 2014

(54) OPTICAL WAVEGUIDE AND A METHOD OF FABRICATING AN OPTICAL WAVEGUIDE

(75) Inventor: Richard C. A. Pitwon, Fareham (GB)

(73) Assignee: Xyratex Technology Limited, Havant (GB)

(*) Notice: Subject to any disclaimer, the term of this patent is extended or adjusted under 35 U.S.C. 154(b) by 165 days.

(21) Appl. No.: 13/157,736

(22) Filed: Jun. 10, 2011

(65) Prior Publication Data

US 2012/0314990 A1 Dec. 13, 2012

(51) Int. Cl.
*G02B 6/02* (2006.01)

(52) U.S. Cl.
USPC ............ 385/123; 385/14; 385/122; 385/124; 385/125; 385/126; 385/127; 385/128; 385/129; 385/130; 385/131; 385/132

(58) Field of Classification Search
USPC ............................................. 385/14, 122–132
See application file for complete search history.

(56) References Cited

U.S. PATENT DOCUMENTS

| | | | |
|---|---|---|---|
| 5,317,657 A | 5/1994 | Gallo et al. | |
| 5,696,865 A | 12/1997 | Beeson et al. | |
| 6,236,784 B1 * | 5/2001 | Ido | 385/45 |
| 6,243,525 B1 * | 6/2001 | Luizink et al. | 385/132 |
| 6,341,189 B1 * | 1/2002 | Deacon | 385/130 |
| 6,487,354 B1 | 11/2002 | Ferm et al. | |
| 6,542,684 B2 | 4/2003 | Eldada et al. | |
| 6,546,161 B2 * | 4/2003 | Okuno et al. | 385/14 |
| 6,775,453 B1 | 8/2004 | Hornbeck et al. | |
| 6,836,608 B2 | 12/2004 | Kishimoto et al. | |
| 6,888,663 B2 | 5/2005 | Bourdelais et al. | |
| 7,088,892 B2 * | 8/2006 | Eldada et al. | 385/45 |
| 7,218,812 B2 | 5/2007 | Maxwell et al. | |
| 7,776,236 B2 | 8/2010 | Shih et al. | |
| 2001/0031122 A1 | 10/2001 | Lackritz et al. | |
| 2002/0122615 A1 * | 9/2002 | Painter et al. | 385/15 |
| 2002/0172464 A1 | 11/2002 | Delwala | |
| 2002/0176687 A1 | 11/2002 | Diemeer et al. | |
| 2003/0031443 A1 | 2/2003 | Soljacic et al. | |
| 2003/0038251 A1 | 2/2003 | Livesay et al. | |
| 2003/0044118 A1 * | 3/2003 | Zhou et al. | 385/43 |
| 2003/0185530 A1 | 10/2003 | White | |
| 2004/0005128 A1 | 1/2004 | DiGiovanni et al. | |

(Continued)

FOREIGN PATENT DOCUMENTS

| | | |
|---|---|---|
| EP | 0 420 173 | 4/1991 |
| WO | 98/40771 | 9/1998 |
| WO | 03/100923 | 12/2003 |

OTHER PUBLICATIONS

Meint K. Smit et al., "A Normalized Approach to the Design of Low-Loss Optical Waveguide Bends," Journal of Lightwave Technology, vol. 11, No. 11, pp. 1737-1742 (Nov. 1993).

(Continued)

*Primary Examiner* — Ryan Lepisto
*Assistant Examiner* — Guy Anderson
(74) *Attorney, Agent, or Firm* — Pillsbury Winthrop Shaw Pittman LLP

(57) ABSTRACT

There is provided an optical waveguide comprising an optical core having transverse sides, the optical core extending along a curved path; an optical cladding on the transverse sides of the optical core, wherein the distribution of the optical cladding on the transverse sides of the optical core is asymmetric about the centre of the core.

35 Claims, 36 Drawing Sheets

(56) References Cited

U.S. PATENT DOCUMENTS

| | | |
|---|---|---|
| 2004/0028369 A1 | 2/2004 | Aylward et al. |
| 2004/0076394 A1 | 4/2004 | Carniel et al. |
| 2004/0101268 A1 | 5/2004 | Shih et al. |
| 2004/0101782 A1 | 5/2004 | Gorczyca |
| 2004/0120676 A1 | 6/2004 | Lee et al. |
| 2005/0053346 A1 | 3/2005 | Deng et al. |
| 2005/0207699 A1* | 9/2005 | Painter et al. .............. 385/32 |
| 2006/0127021 A1 | 6/2006 | Erben et al. |
| 2008/0166095 A1 | 7/2008 | Popovic et al. |
| 2008/0253728 A1 | 10/2008 | Sparacin et al. |
| 2008/0267239 A1 | 10/2008 | Hall et al. |
| 2008/0298761 A1 | 12/2008 | Bond et al. |
| 2009/0218519 A1 | 9/2009 | McLeod |
| 2010/0195683 A1* | 8/2010 | Coleman et al. ........... 372/43.01 |
| 2011/0026879 A1* | 2/2011 | Popovic et al. ................ 385/28 |

OTHER PUBLICATIONS

International Search Report and Written Opinion mailed Sep. 11, 2012 in corresponding International Patent Application No. PCT/GB2012/051202.

* cited by examiner

OPTICAL WAVEGUIDE AND A METHOD OF FABRICATING AN OPTICAL WAVEGUIDE

The present invention relates to an optical waveguide and a method of fabricating an optical waveguide. The present invention also relates to an optical printed circuit board on which one or more optical waveguides are formed.

In embodiments, the present invention relates to an optical waveguide and a method of fabricating the waveguide for guiding optical signals along a curved path with reduced propagation losses, thus enabling the guiding of optical signals along curved paths with radii of curvature that were previously too small to implement.

With ever increasing volumes of data being captured, processed, conveyed and stored as digital information, data storage devices and networking technologies have been developed to incorporate, for example, optical fibre channels to increase communication bandwidth. For instance, the data rate of Serial Attached SCSI (SAS), the dominant protocol governing interconnects on storage array midplanes, is expected to increase to 12 Gb/s in the very near future. With such dramatic increase in system bandwidth the density of components and channels on a printed circuit board (PCB) will increase correspondingly. Thus, data storage systems will be prone to problems such as crosstalk, dielectric loss, skin effect, and electromagnetic interference.

A proposed solution to alleviate these performance issues is to incorporate electro-optical PCBs and interconnect onto the midplane of a data storage system. The PCBs and interconnect may be rigid or flexible. In either case it will be appreciated that there is generally a plane, be it flat or curved, which defines an interconnect layer. More generally, the use of optical channels for the transmission of data and control signals on a PCB can be used to increase available data rates.

A key component of a successful low-cost implementation of optical PCBs is embedded symmetric optical polymer waveguide. FIG. 1 shows a schematic cross section and the refractive index profile along the line XX' of the cross section of a typical waveguide 10. As shown in this figure, the waveguide consists of a length of material, commonly referred to as the core 11, surrounded by a material of a fractionally lower refractive index, commonly referred as the cladding 12. In simple terms, the refractive index contrast at the core/cladding boundary enables an optical signal propagating along the core 11 to be confined within the core 11 by total internal reflection. Suitable materials for fabricating optical waveguides include various types of glass and acrylic. More recently, optically inert polymers have been employed for the fabrication of waveguides with the advantages of reduced manufacturing cost and simpler fabrication process.

There are accordingly many design benefits of optical polymer waveguides. However, one problem that arises relates to the minimum radius of curvature for an optical polymer waveguide. As a waveguide curves in its path on an optical PCB, losses will typically occur. There is therefore a "minimum radius of curvature" for an optical polymer waveguide, below which losses would be too significant. For different applications, the minimum radius of curvature may vary depending on the wavelength of the propagating optical signal, length of the waveguide, and the number of curved portions in the waveguide. However, a smaller minimum radius of curvature is clearly advantageous in that a higher the number of waveguides will be able to be located in unit area on an optical PCB and a greater manoeuvrability, control and arrangement of waveguide paths is afforded, since a smaller footprint will be required for turning a corner in a waveguide.

In other words, the large minimum radius of curvature in the plane of the interconnect layer below which the waveguide becomes impractical remains a problem. Characterization of optical propagation losses in printed multimode optical polymer waveguides has shown that transverse losses due to scattering of higher order modes caused by increase in interfacial defects will typically restrict the radius of curvature to greater than 10 mm to 15 mm. In terms of device design, it would be very difficult and severely limiting to accommodate such large radii of curvature within a high density PCB.

An additional problem exists for curved waveguides where the mode profile of a propagating optical signal skews away from the centre of curvature of the waveguide. The result is a spatial mismatch of mode profiles of propagating signals between straight parts and curved parts of the waveguide. This can cause coupling losses that compound the increase in scattering losses caused by the increase in interfacial defects. The skewing of the mode profile towards the sides of the waveguide also increases propagation losses, further limiting the acceptable minimum radius of curvature.

A hybrid buried/ridge planar waveguide for use with materials such as GaAs/AlGaAs is described in US-A-2004/0076394. The waveguide comprises a combination of buried waveguide sections and ridge waveguide sections on the same substrate, sharing a common core layer. The buried waveguide sections provide the low refractive index contrast desirable for couplers and other device components, and the ridge waveguide sections provide the high refractive index contrast needed for efficient low-loss tightly curved waveguides.

In the article entitled "A Normalized Approach to the Design of Low-Loss Optical Waveguide Bends", by Smit et al. (J. Lightwave Tech. Vol. 10 No. 11 1993) it is shown that the core of a waveguide may be offset at a curve to improve the spatial overlap between the mode profile of a curved part and the mode profile of an adjoining straight part so as to reduce coupling losses. Smit et at. also showed that such an offset core can be exploited, by appropriate optimization, such that an optical signal may couple to the Whispering Gallery Mode of the curved part as it propagates from an adjoining straight part to the curved part of the waveguide.

The use of a high refractive index contrast boundary to improve mode confinement is known. For example, WO-A-03/038501 describes using high refractive index contrast boundaries in waveguides to improve light confinement to reduce the allowable bend radius of a waveguide. US-A-2008/0166095 describes the designs for a semiconductor waveguide where the refractive index of the core is preferably twice that of the cladding. US-A-2008/0253728 describes the use of an interface layer with an intermediate refractive index between a high refractive index core and a low refractive index cladding. US-A-2008/0267239 describes a semiconductor waveguide having an oxide-clad core formed by oxidizing the surface of the core where the low refractive index of the oxide layer and the high refractive index of the core provide the high refractive index contrast. US-A-2008/0298761 describes a similar waveguide having a high refractive index core surrounded by a layer of low refractive index oxidized core material.

According to a first aspect of the present invention, there is provided an optical waveguide comprising an optical core having transverse sides, the optical core extending along a curved path, an optical cladding at least on the transverse sides of the optical core, wherein the distribution of the optical cladding on the transverse sides of the optical core is asymmetric about the centre of the core.

A waveguide is provided in which, in contrast to known optical waveguides, the cladding is provided so as to be asymmetrically distributed along the sides of the waveguide. In other words, the cladding is thicker (or thinner) on one side of the core than the other. This enables optical modes propagating in the waveguides to be controlled in such a way that a smaller minimum radius of curvature is achievable as compared to what would be possible with a symmetric distribution of cladding.

In an embodiment, the optical cladding is structured to form a spine and the optical core is provided within the spine. Thus, a convenient means for providing a waveguide with asymmetric cladding is provided. Furthermore, the spine would enable the structure as a whole to operate as nested waveguides as described in greater detail below.

In an embodiment, the optical core and the optical cladding are formed of polymer materials.

In an embodiment, a low refractive index layer is provided at least on the transverse sides of the optical cladding.

In an embodiment, a protective superstrate is provided above the optical cladding.

In an embodiment, the refractive index of the optical cladding is substantially higher than the refractive index of the low refractive index layer.

In an embodiment, the refractive index of the optical core varies in the transverse direction.

In an embodiment, the refractive index of the optical cladding varies in the transverse direction.

In an embodiment, the distribution of the optical cladding on the transverse sides of the optical core varies along the optical waveguide.

In an embodiment, the optical waveguide includes a first portion connected to a second portion, the first portion being a curved portion; wherein the optical cores of the connecting first and second portions are transversely displaced.

In an embodiment, the second portion is a curved portion.

In an embodiment, there is provided an optical printed circuit board comprising a substrate, and one or more optical waveguides according to the first aspect of the present invention provided on the substrate.

According to a second aspect of the present inventions, there is provided a method of fabricating an optical waveguide, the method comprising providing an optical core having transverse sides, the optical core extending along a curved path; providing an optical cladding at least on the transverse sides of the optical core, wherein the distribution of the optical cladding on the transverse sides of the optical core is asymmetric about the centre of the core.

In an embodiment, a low refractive index layer is provided at least on the transverse side of the optical cladding.

In an embodiment, a protective superstrate is provided above the optical cladding.

In an embodiment, the optical waveguide includes a first portion connected to a second portion, the first portion being a curved portion; and the optical cores of the connecting first and second portions are displaced transversely.

In an embodiment, the second portion is a curved portion.

In an embodiment, the optical core and the optical cladding are structured by photolithography.

In an embodiment, a grey scale mask is employed in the photolithographic process.

In an embodiment, the optical core and the optical cladding are cured by laser direct imaging.

In an embodiment, the laser direct imaging process includes a laser beam of non-uniform intensity.

In an embodiment, unwanted areas of the optical core and unwanted areas of the optical cladding are removed by laser ablation.

In an embodiment, there is provided a method of fabricating an optical printed circuit board, the method comprising providing a substrate, and providing one or more optical waveguides according to the first aspect of the present invention on the substrate.

In an embodiment, the optical core and the optical cladding are structured by photolithography.

In an embodiment, a grey scale mask is employed in the photolithographic process.

In an embodiment, the optical core and the optical cladding are cured by laser direct imaging.

In an embodiment, the laser direct imaging process includes a laser beam of non-uniform intensity In an embodiment, unwanted areas of the optical core and unwanted areas of the optical cladding are removed by laser ablation.

According to a third aspect of the present invention, there is provided an optical waveguide comprising, an optical core formed of polymer material, the optical core having transverse sides and extending along a curved path, and an optical cladding at least on the transverse sides, the optical cladding being formed of polymer materials, wherein the optical cladding is structured to form a spine and the optical core is provided within the spine.

In an embodiment, the distribution of the optical cladding on the transverse sides is symmetric about the centre of the optical core.

In an embodiment, a low refractive index layer is provided around the spine of the structured optical cladding.

In an embodiment, a protective superstrate is provided above the optical cladding.

In an embodiment, the refractive index of the optical cladding is substantially higher than the refractive index of the low refractive index layer.

In an embodiment, the refractive index of the optical core varies in the transverse direction.

In an embodiment, the refractive index of the optical cladding varies in the transverse direction.

In an embodiment, the optical waveguide includes a first portion connected to a second portion, the first portion being a curved portion, wherein the optical cores of the connecting first and second portions are transversely displaced.

In an embodiment, the second portion is a curved portion.

In an embodiment, there is provided an optical printed circuit board comprising, a substrate; and one or more optical waveguides according to the third aspect of the present invention provided on the substrate.

Thus, there is a provided a design and method of fabrication for optical waveguides which enables a smaller minimum radius of curvature of the waveguide to be achieved without incurring significant propagation losses.

Embodiments of the present invention will hereinafter be described by way of example, with reference to the accompanying drawings, in which.

Figure 1:
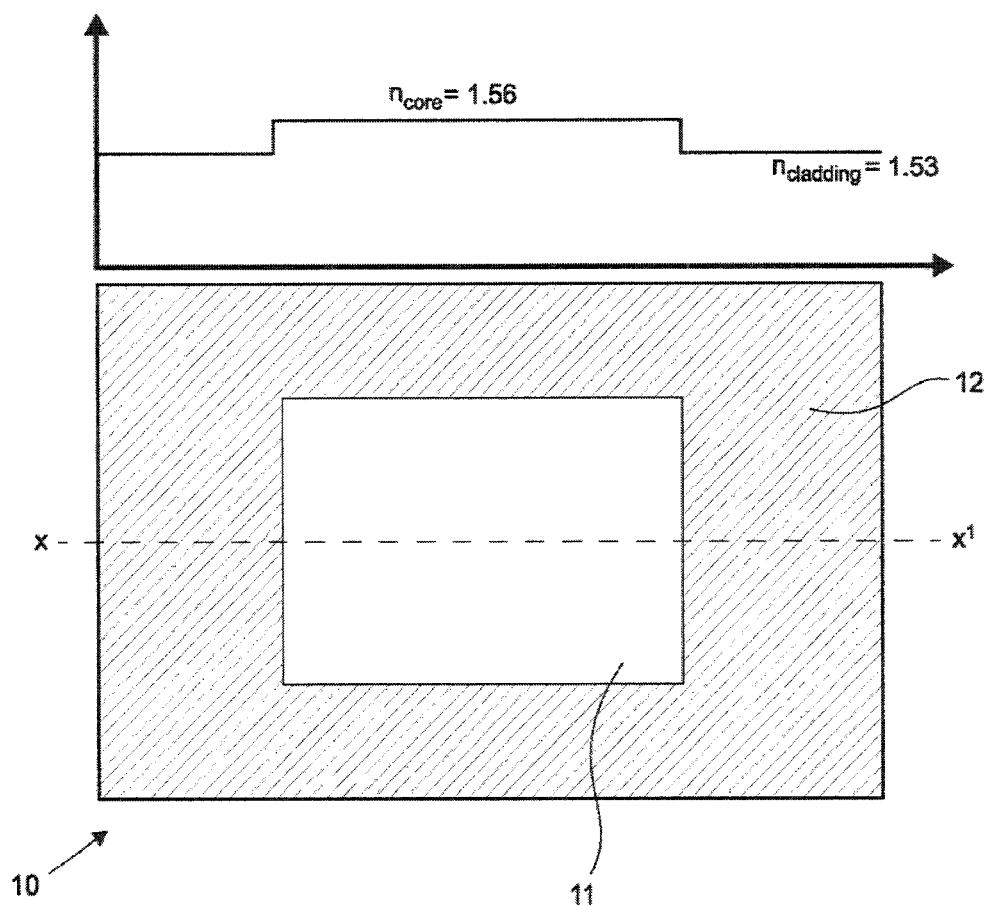
FIG. 1 shows a schematic cross section and refractive index profile of an example of a waveguide.
Figure 2:
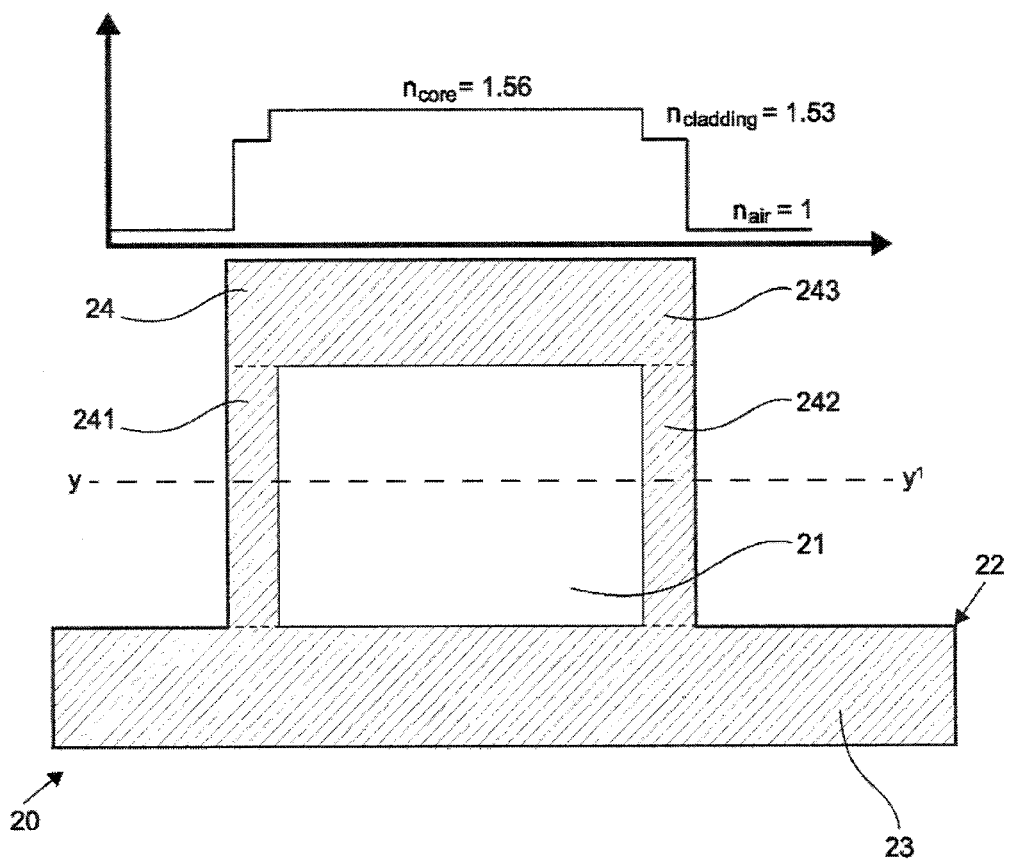
FIG. 2 shows a schematic cross section and refractive index profile of a symmetric optical polymer waveguide with symmetric thin cladding.

FIG. 2 shows a schematic cross section and the refractive index profile along the line YY' of the cross section of a symmetric optical polymer waveguide 20 with a structured cladding that provides improved transverse confinement of a propagating optical signal. In this example, the symmetric optical polymer waveguide 20 includes a core 21, and a cladding 22 surrounding the core 21. The cladding 22 is structured to form a spine such that the core 21 is provided in the spine. Typically, the waveguide 20 is formed on a substrate which is not show in FIG. 2. In this arrangement, the cladding 22 may be divided into a lower cladding layer 23 and an upper cladding layer 24. Examples of materials suitable for forming the core 21 and the cladding 22 are listed, but not limited to those listed, in Table 1.

TABLE 1

| Material | Refractive index |
|---|---|
| 1,1,1,3,3,3-Hexafluoroisopropyl acrylate 99% | 1.3 |
| 1,1,1,3,3,3-Hexafluoroisopropyl methacrylate | 1.33 |
| 2,2,2-Trifluoroethyl acrylate | 1.35 |
| 2,2,2-Trifluoroethyl methacrylate | 1.36 |
| 2,2,3,3,3-Pentafluoropropyl acrylate | 1.33 |

TABLE 1-continued

| Material | Refractive index |
|---|---|
| 2,2,3,3,3-Pentafluoropropyl methacrylate | 1.34 |
| 2,2,3,3,4,4,4-Heptafluorobutyl acrylate | 1.33 |
| 2,2,3,3,4,4,4-Heptafluorobutyl methacrylate | 1.34 |
| Poly(2,2,3,3,3-pentafluoropropyl methacrylate) | 1.41 |
| Poly(2,2,3,4,4,4-hexafluorobutyl acrylate) | 1.39 |

The lower cladding layer 23 is provided immediately adjacent to the core 21, extending laterally beyond the width of the spine of the cladding 22. The upper cladding layer 24 can be further divided into side cladding layer 241, side cladding layer 242, and top cladding layer 243. Side cladding layer 241 and side cladding layer 242 are provided immediately adjacent to the transverse sides of the core 21 and extend above the lower cladding layer up to the height of the core 21. The top cladding layer 243 is provided immediately above the core 21 and the two side cladding layers and extends across the whole width of the spine of the cladding 22. As shown in FIG. 2, air is provided in the region external to the core 21 and cladding 22. However, it will be appreciated that any material with a refractive index substantially lower than that of the cladding 22 may be provided in this region.

Preferably, the thicknesses of side cladding layer 241 and side cladding layer 242 are substantially the same, ranging from 5 μm to 20 μm. Alternatively, the thickness of an individual side cladding layer may range from 10% to 40% of the width of the waveguide. The advantage of the symmetric optical polymer waveguide 20 of FIG. 2 is that the thicknesses of the side cladding layers are sufficiently small such that the cladding/air boundary provides a high refractive index contrast to improve the lateral confinement of an optical signal propagating along the symmetric optical polymer waveguide 20, while the low refractive index contrast at the core/cladding boundary ensures that the scattering effect from the side wall roughness of the core is minimized. It will be appreciated that a purely high refractive index contrast waveguide, such as one comprising a core surrounded by air, would suffer from much higher scattering losses due to side wall roughness.

In practical applications, the symmetric optical polymer waveguide 20 of FIG. 2 may be formed on an optical PCB which may include multiple symmetric optical polymer waveguides 20. The use of such a waveguide structure, which may be referred to as a "nested" polymer waveguide has significant advantages. In particular, as described above, in the area of symmetric optical polymer waveguides and midplanes within storage systems, the use of polymer waveguides enables data rates to be increased whereas by the use of a nested polymer waveguide structure the previous problem of a relatively large minimum radius can be addressed. In other words, the minimum radius can be reduced as compared to known polymer waveguide structure, whilst still ensuring losses and other such effects are at acceptable levels.

FIGS. 3 to 11 show schematic representations of the various stages of the photolithographic process used to fabricate multiple symmetric optical polymer waveguides 20 on an optical PCB.

Figure 3:
FIGS. 3 to 12 show schematic representations of the various stages of the photolithographic process for fabricating multiple symmetric optical polymer waveguide on an optical PCB.
Figure 4:
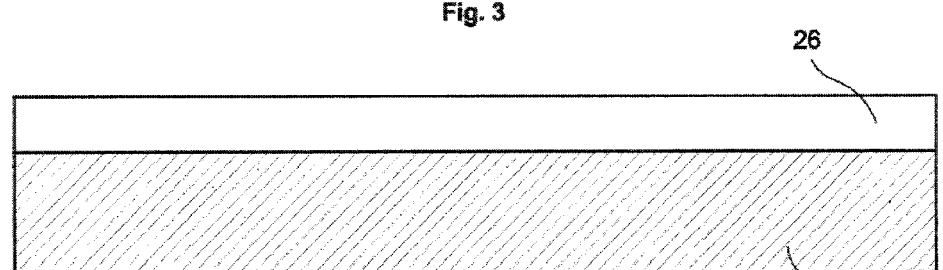
Figure 5:
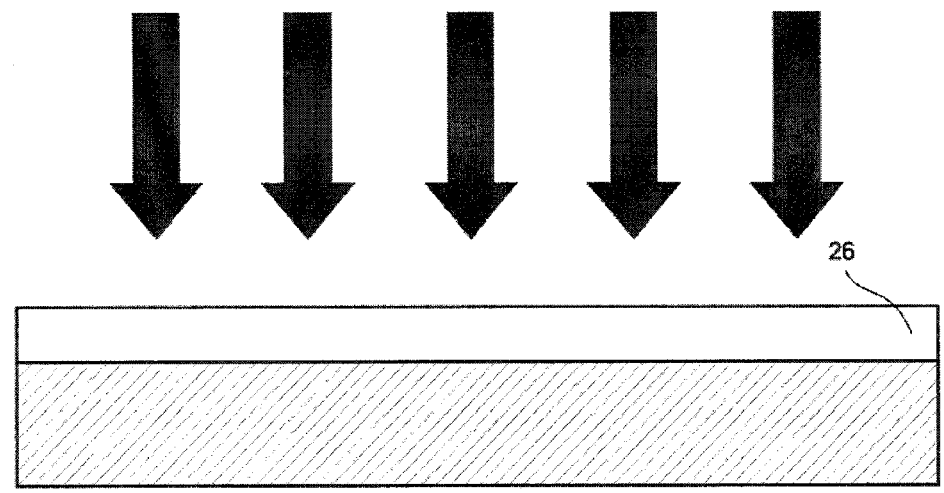
Figure 6:
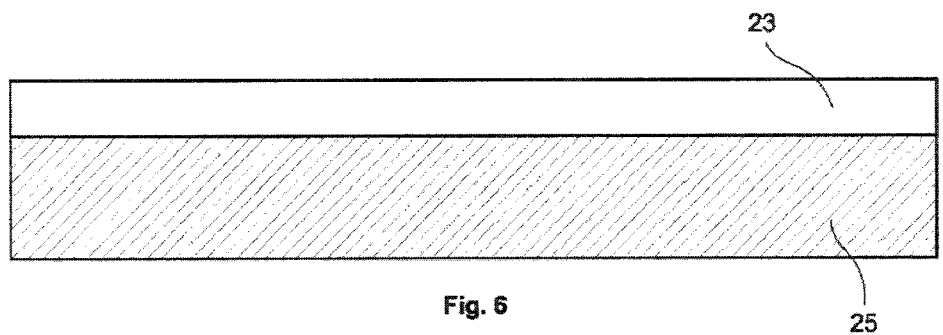
Figure 7:
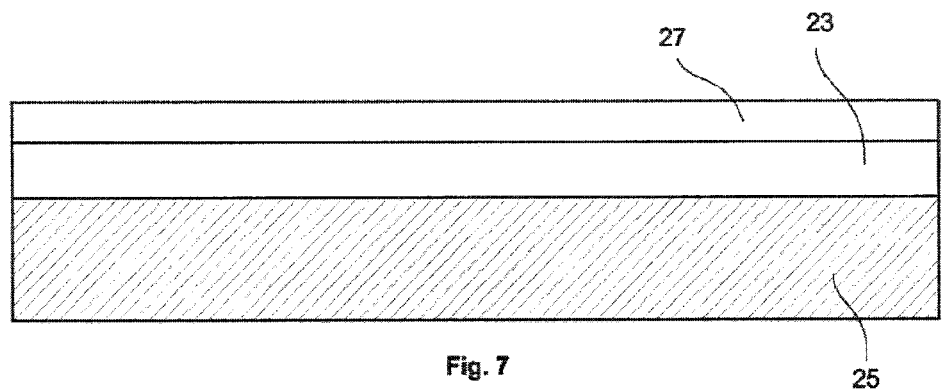

Referring to FIG. 3, initially a substrate 25 is provided. The substrate 25 may be any suitable material, but typically is a material such as FR4 or any other appropriate PCB support material. In FIG. 4, a layer 26 of uncured cladding material is provided on the substrate 25. The cladding material is typically a polymeric material suitable for use as an optical cladding. In this example, the polymeric material is curable with ultra-violet radiation. That is, it remains soluble in solvents used in subsequent etching processes and becomes insoluble upon exposure to UV radiation. In FIG. 5, the layer 26 of uncured cladding material is exposed to a suitable dose of curing radiation such as UV radiation, forming the cured lower cladding layer 23 shown in FIG. 6. Once cured, a layer 27 of uncured core material is provided on the cured lower cladding layer 23, as shown in FIG. 7. Throughout the description, the example of UV curing radiation is used. It will be appreciated that this is merely one possible example of curing radiation that can be used. Curing radiation at any appropriate wavelength can be used.

Figure 8:
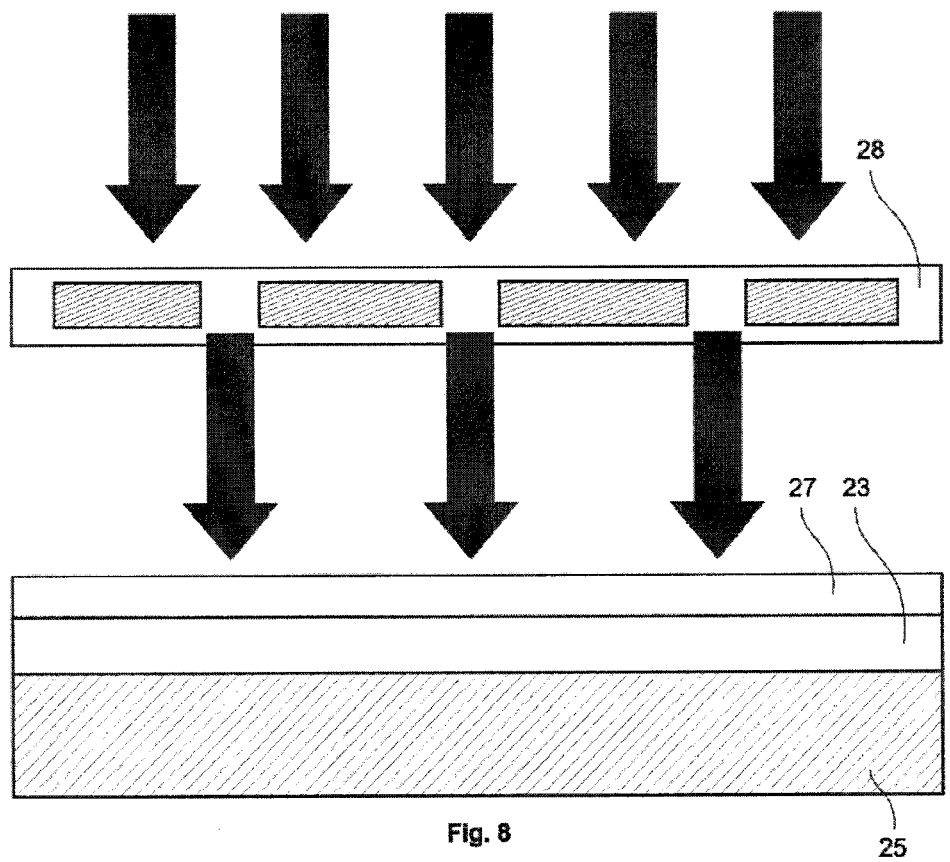
Figure 9:
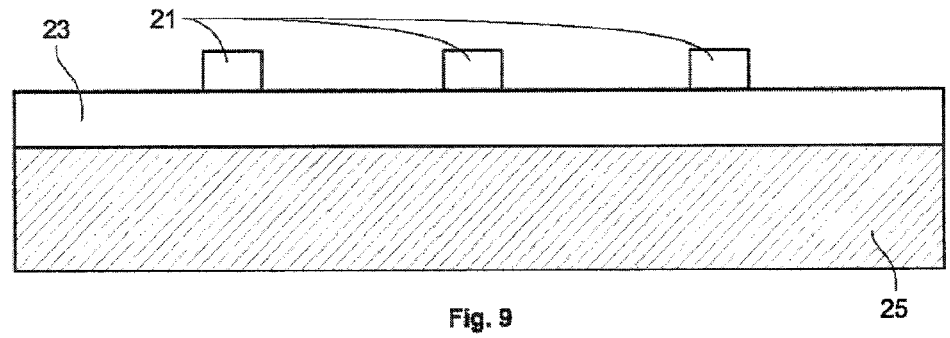

In the example shown, the core material is also of a UV-curable polymeric material with a refractive index fractionally higher than that of the cladding material. In FIG. 8, a photolithographic mask 28 incorporating the desired designs of the cores 21 of the symmetric optical polymer waveguides 20 is provided above the layer 27 of uncured core material and the structure is exposed to a second dose of UV radiation through the photolithographic mask 28. This forms a layer of partially cured core material with regions corresponding to the cores 21 of the symmetric optical polymer waveguides 20 cured, and the remaining unwanted areas uncured. The unwanted areas of the partially cured layer of core material may be removed by various means such as chemical etching to form the cores 21 of the symmetric optical polymer waveguides 20 as shown in FIG. 9.

Figure 10:
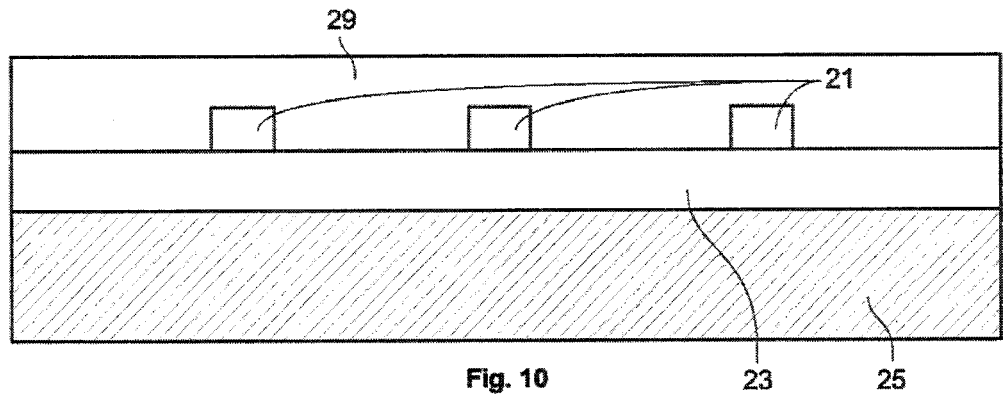
Figure 11:
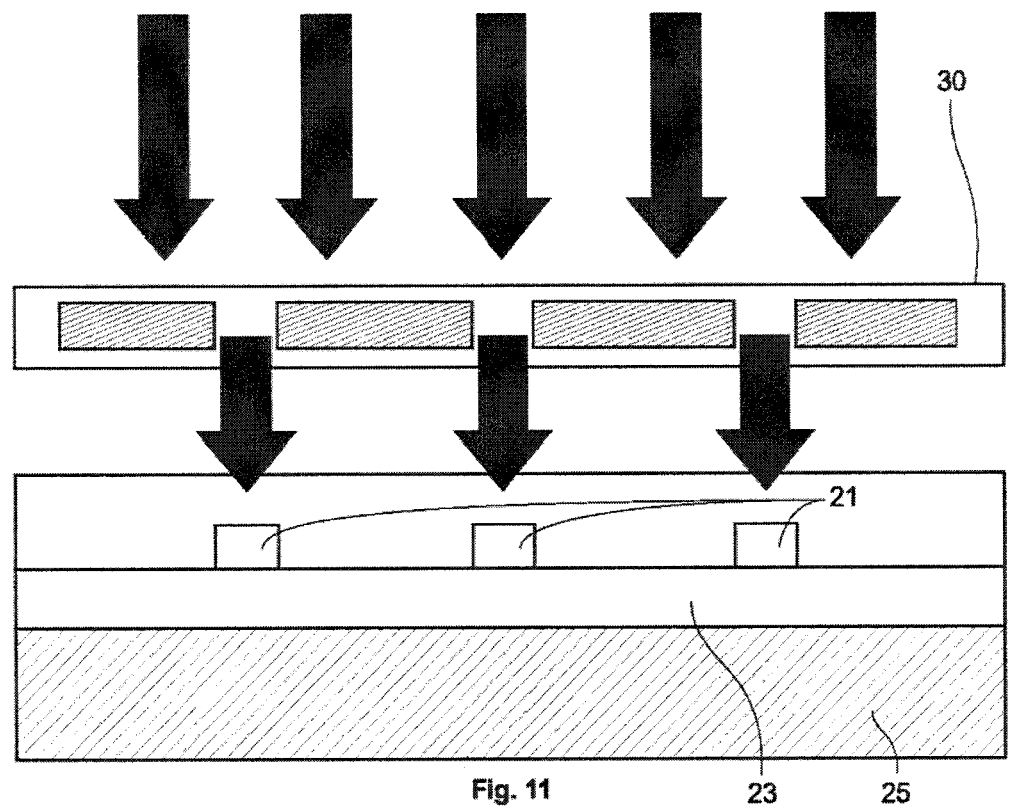
Figure 12:
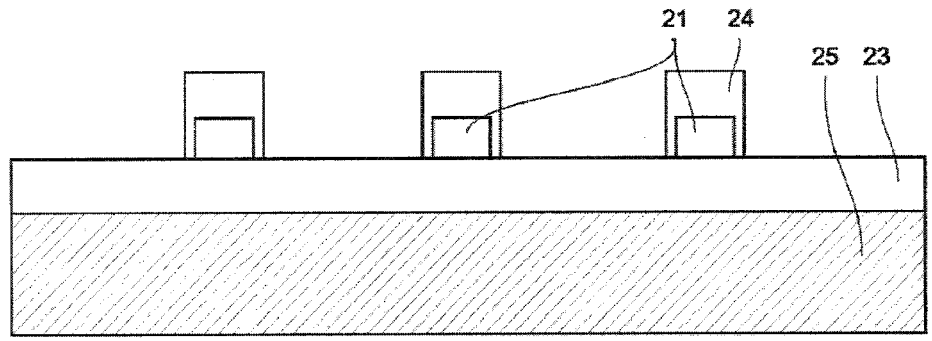

Referring to FIG. 10, a second layer 29 of uncured cladding material is formed over the cores 21 and the cured lower cladding layer 23 of the symmetric optical polymer waveguides 20. In FIG. 11, a second photolithographic mask 30 incorporating the desired designs of the claddings 22 of the symmetric optical polymer waveguides 20 is provided above the second layer 29 of uncured cladding material and the structure is exposed to a third dose of UV radiation through the second photolithographic mask 30. This forms a layer of partially cured cladding material with regions corresponding to the upper cladding layers of the symmetric optical polymer waveguides 20 cured, and the remaining unwanted areas uncured. The unwanted areas of the second partially cured layer of cladding material may also be removed by various means such as chemical etching to form the upper cladding layers 24 of the symmetric optical polymer waveguides 20 as shown in FIG. 12.

Alternatively, the symmetric optical polymer waveguides 20 may be formed by first forming a layer 26 of uncured cladding material on the substrate 25 and then exposing the structure to UV radiation to form a cured lower cladding layer 23. Next a layer 27 of uncured core material is provided or formed over the cured lower cladding layer 23 and this is exposed to UV radiation to form a cured layer of core material. Unwanted areas of the cured layer of core material are removed by laser ablation to form the cores 21 of the symmetric optical polymer waveguides 20. Then a layer 29 of uncured cladding material is provided over the core 21 and the cured lower cladding layer 23. The structure is exposed to UV radiation to form a cured layer of cladding material, and unwanted areas of the cured layer of cladding material are removed by laser ablation to form the symmetric optical polymer waveguide 20.

Figure 13:
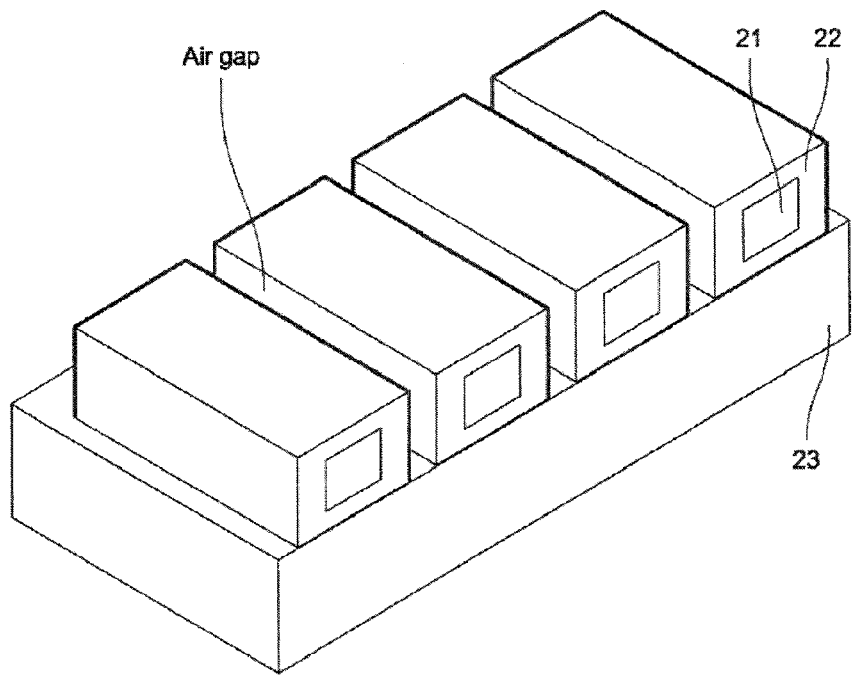
FIG. 13 shows a schematic perspective view of an example of an optical PCB having multiple symmetric optical polymer waveguides.

FIG. 13 shows a perspective view of an example of an optical PCB including multiple symmetric optical polymer waveguides 20 such as those shown in FIG. 2. The thicknesses of the side cladding layers are substantially the same.

Figure 14:
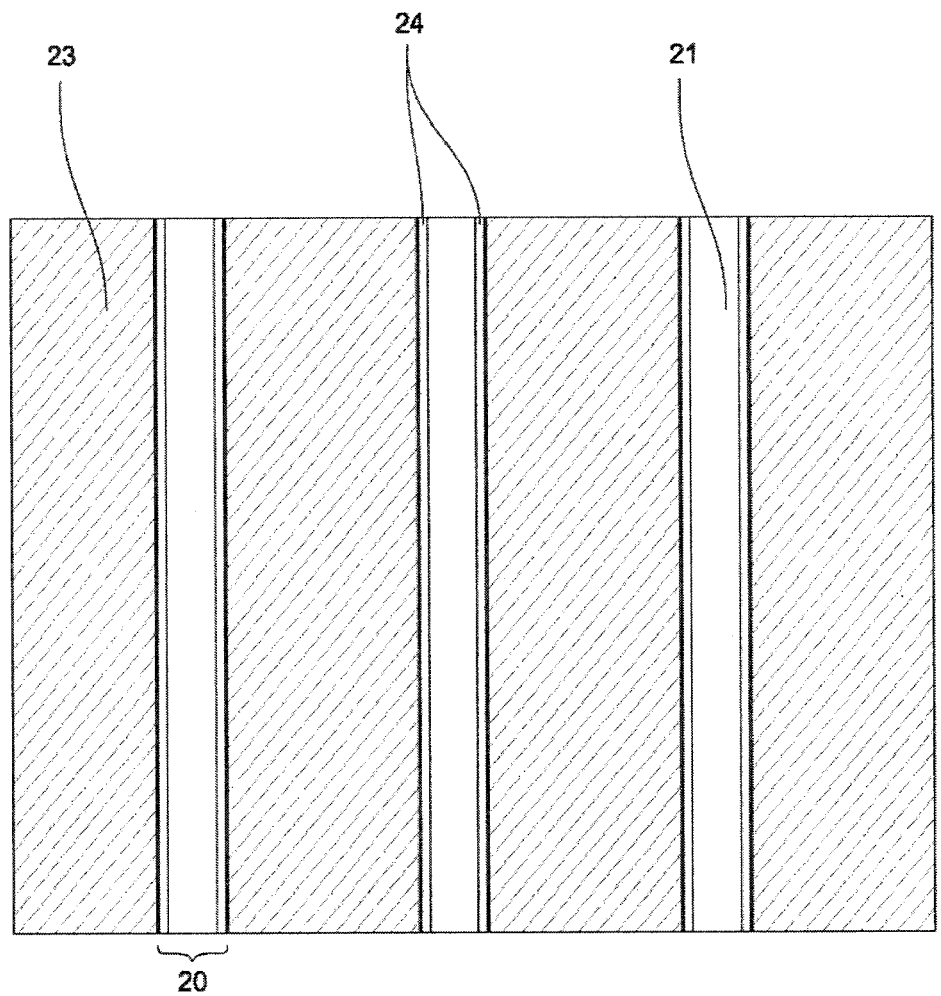
FIGS. 14 to 16 show schematic plan views of an optical PCB having multiple symmetric optical polymer waveguides.
Figure 15:
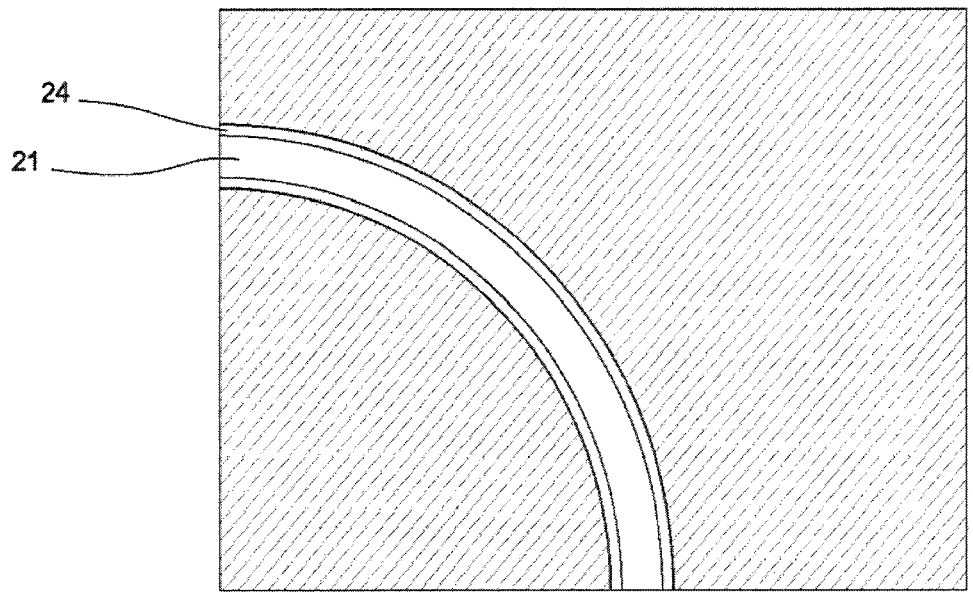
Figure 16:
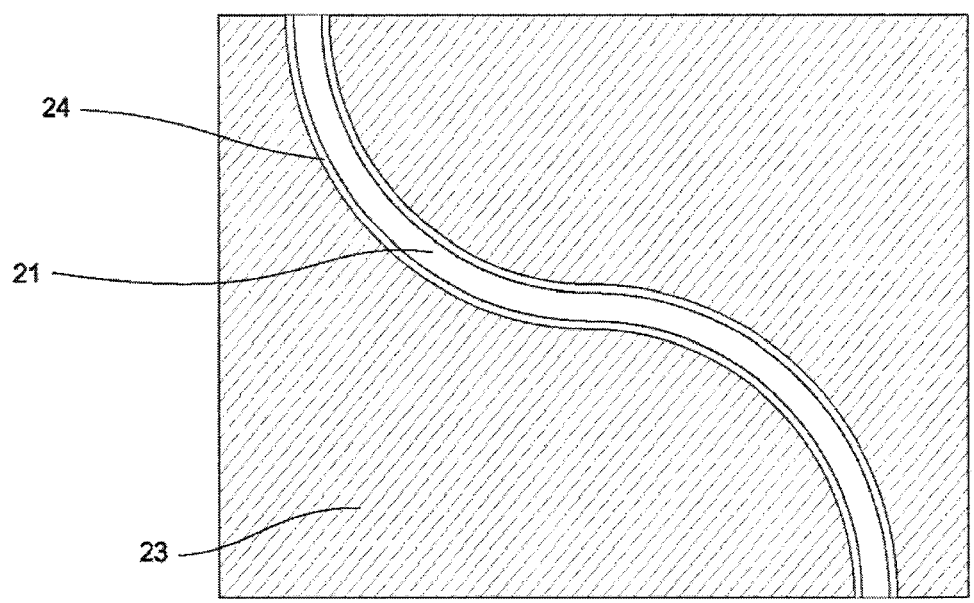

FIGS. 14 to 16 show plan views of optical PCBs including multiple symmetric optical polymer waveguides 20 of various routing configurations. In FIG. 14, the symmetric optical polymer waveguides 20 are straight. In FIGS. 15 and 16, the symmetric optical polymer waveguides 20 have curved configurations. As will be explained below, the minimum acceptable radius of curvature of the waveguides as shown in FIGS. 15 and 16 is reduced with the use of particular shaping and arrangement of the side cladding layers.

Figure 17:
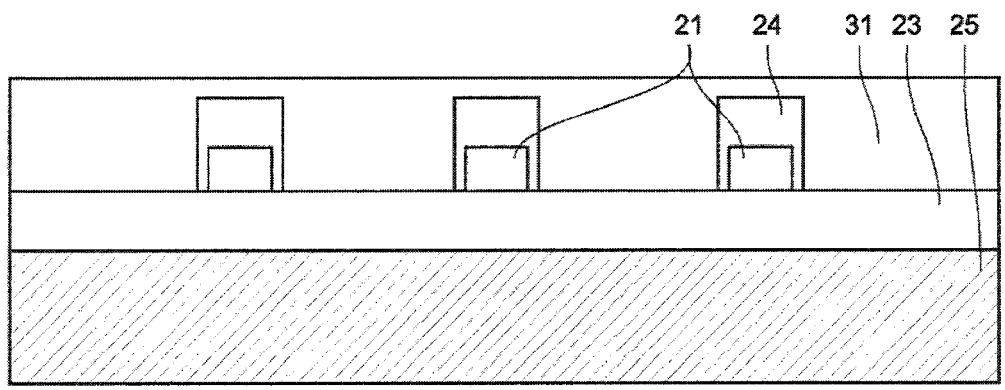
FIG. 17 shows a schematic cross section of another example of an optical PCB having multiple symmetric optical polymer waveguides.
Figure 18:
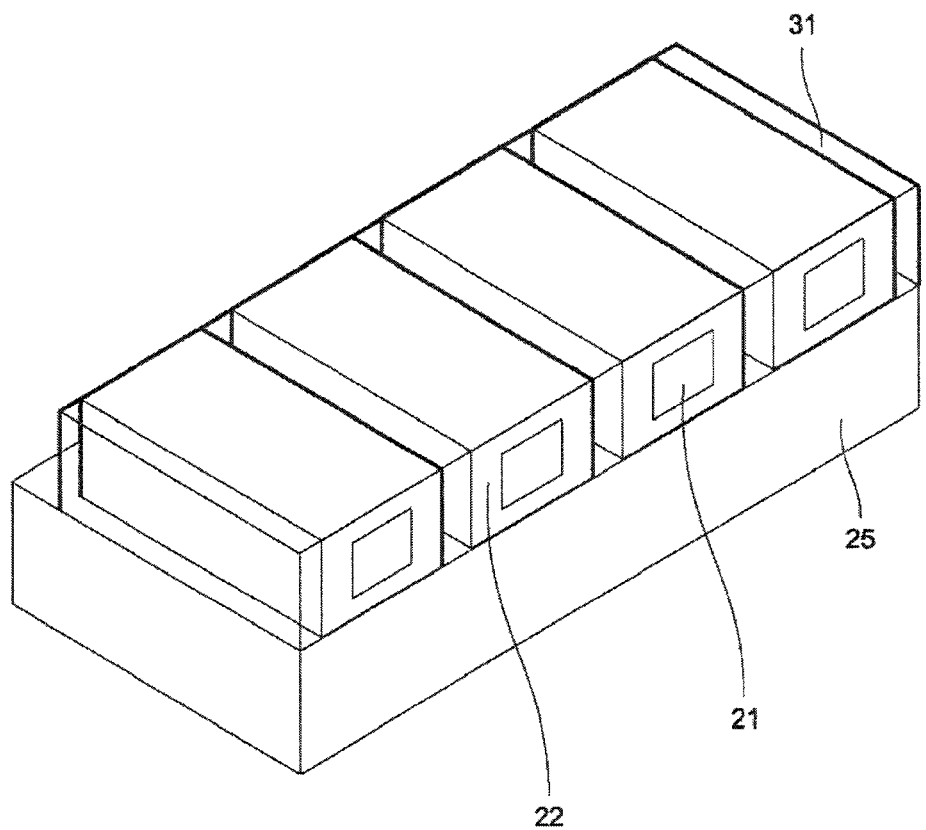
FIG. 18 shows a schematic perspective view of another exemplary optical PCB having multiple symmetric optical polymer waveguides.

Referring to back to FIGS. 12 and 13, air is provided in the regions separating the individual symmetric optical polymer waveguides 20 on the optical PCB. However, in some examples shown in FIGS. 17 and 18, a layer 31 of low refractive index material with a refractive index substantially lower than that of the cladding 22 may be provided above the lower cladding layer 23, filling the regions separating the individual symmetric optical polymer waveguides 20. In the example of FIG. 17, the low refractive index layer 31 is provided above the lower cladding layer 12 and envelopes the upper cladding layers 24 of the symmetric optical polymer waveguides 20. In the example of FIG. 18, the low refractive index layer 31 is arranged such that the thickness of the low refractive index layer 31 above the upper cladding layers 24 is zero.

Figure 19:
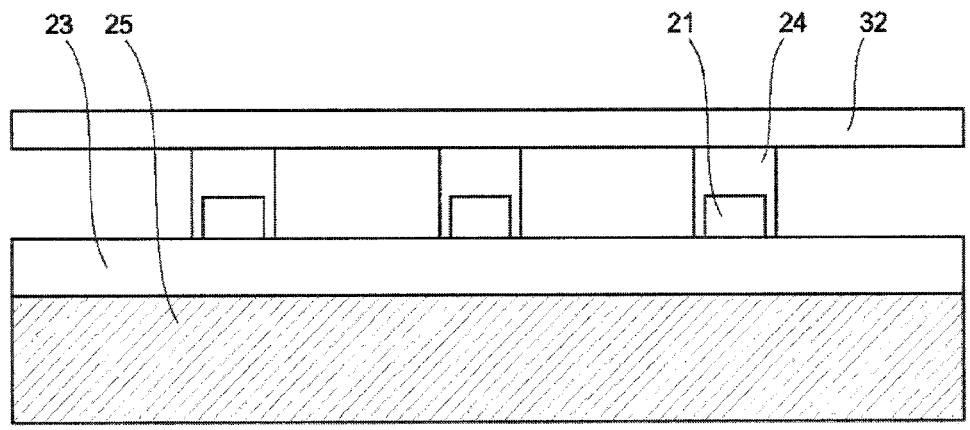
FIGS. 19 and 20 show schematic cross sections of exemplary optical PCBs having a protective superstate.
Figure 20:
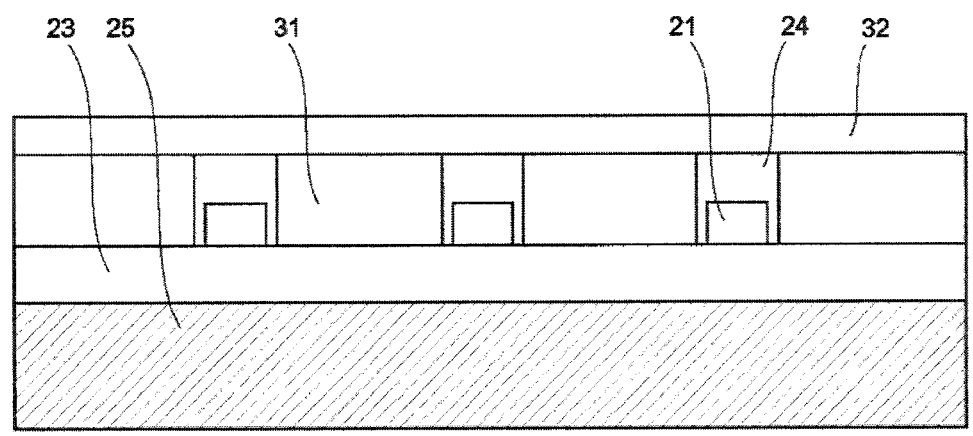

It may additionally be desirable to protect the symmetric optical polymer waveguides 20 described above from damage or contamination such as dirt or other particles. FIGS. 19 and 20 show schematic cross sections of examples of optical PCBs having multiple symmetric optical polymer waveguides 20 with air and low refractive index material respectively separating the individual waveguides, further including a protective substrate or "superstrate" 32 provided over claddings 22 of the symmetric optical polymer waveguides 20.

Figure 21:
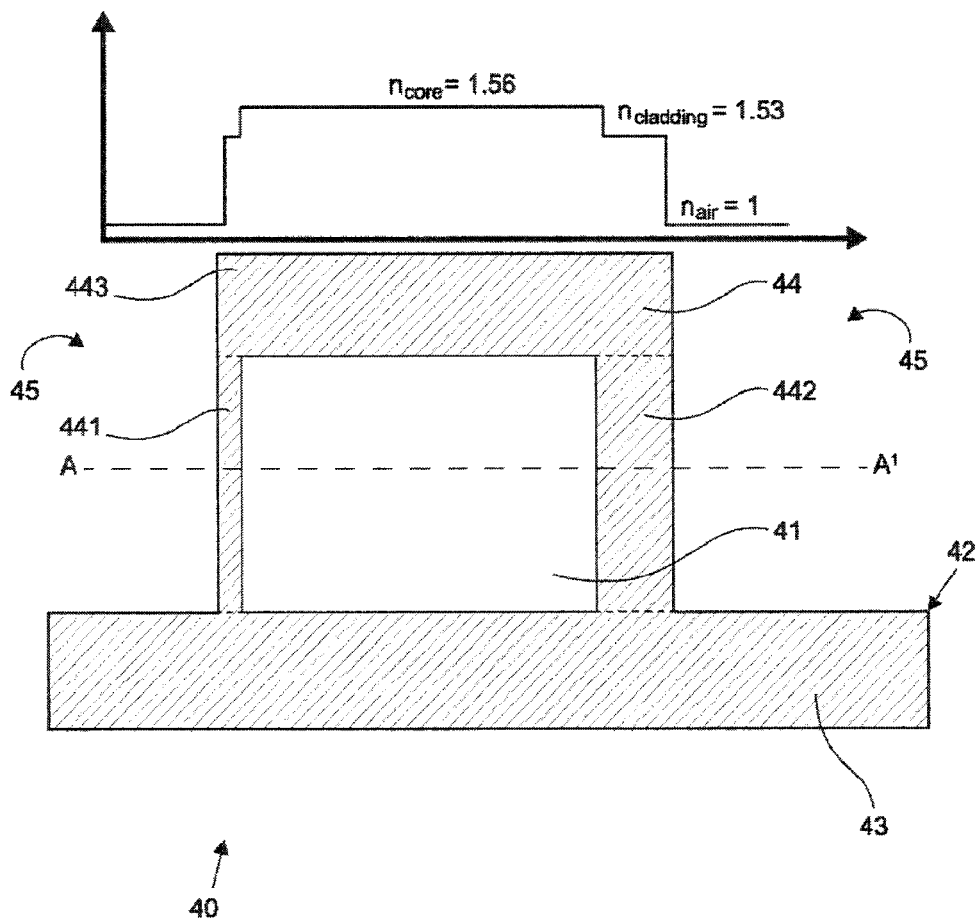
FIG. 21 shows a schematic cross section and refractive index profile of an asymmetric curved waveguide.

FIG. 21 shows a schematic cross section and the refractive index profile along the line AA' of the cross section of an asymmetric curved waveguide 40 having asymmetric side cladding layers. In this embodiment, the asymmetric curved waveguide 40 comprises a core 41, and a cladding 42 structured to form a spine within which the core 41 is provided. Examples of material suitable for forming the core 41 and the cladding 42 are also listed, but not limited to those listed, in Table 1. It will be appreciated that the waveguide 40 of FIG. 21 may be formed of non-polymeric material.

Typically, the asymmetric curved waveguide 40 is formed on a substrate which, again, is not shown. In this arrangement, the cladding 42 may be divided into a lower cladding layer 43 and an upper cladding layer 44. The lower cladding layer 43 is provided immediately adjacent to the core 41, extending laterally beyond the width of the spine of the cladding 42. The upper cladding layer 44 can be further divided into side cladding layer 441, side cladding layer 442, and top cladding layer 443. In this example, side cladding layer 441 and side cladding layer 442 are provided immediately adjacent to either side of the core 41 and extend above the lower cladding layer 43 up to the height of the core 41. Top cladding layer 443 is provided immediately above the core 41 and the two side cladding layers, extending across the whole width of the spine of the cladding 42. As shown in FIG. 21, air is provided in the region 45 external to the core 41 and the cladding 42. However, it will be appreciated that any material with a refractive index substantially lower than that of the cladding 42 such as those listed in Table 1 may be provided in this region.

As shown in FIG. 21, the core 41 of the asymmetric curved waveguide 40 has a substantially rectangular cross-section, where a centre of the core 21 can be easily defined. However, it will be appreciated that the core 41 may have a trapezoidal or an elliptical, e.g. circular, cross-section, where a centre can also be easily defined. For a core 21 having an elliptical cross-section, sides of the core 21 may then be defined as sectors of the circumference, which may or may not be of the same length.

In the embodiment of FIG. 21, to alleviate the coupling losses due to spatial mismatch of mode profiles as described by Smit et al. and at the same time provide improved transverse confinement for an optical signal propagating along a curved waveguide, side cladding layer 441 and side cladding layer 442 of the asymmetric curved waveguide 40 are arranged so that the thickness of the side cladding layer nearest to the centre of curvature, hereafter referred to as the "interior" side, is greater than the side cladding layer furthest from the centre of curvature, hereafter referred to as the "exterior" side. By providing cladding layers on both sides of the core 41 in the manner described, protection is provided to the waveguide core and in addition some significant technical benefits are derived as explained below.

In the example of FIG. 21, side cladding layer 441 is the exterior side, and side cladding layer 442 is the interior side. In addition to the asymmetry of the side cladding layers, the thickness of the exterior side cladding layer 441 is arranged to be sufficiently small so that high refractive index contrast boundary at the cladding/air interface is closer to the low refractive index contrast boundary at the core/cladding boundary. Typically, the thickness of an individual side cladding layer range from 5 μm to 20 μm. Alternatively, the thickness of an individual side cladding layer may range from 10% to 40% of the width of the waveguide.

By providing asymmetric side cladding layers, i.e. side cladding layers of different thicknesses on different sides of the core, the asymmetric curved waveguide 40 of FIG. 21 may be considered as a straight waveguide with a sloping effective refractive index profile that increases from the air/cladding boundary of the exterior side cladding layer 441 to the air/cladding boundary of the interior side cladding layer 441. As described by Smit et al., in terms of the mode profile of a propagating optical signal, the skewing of the mode profile towards the exterior side of a curved waveguide can be viewed as equivalent to the skewing of the mode profile towards the higher refractive index region of a straight waveguide with a sloping effective refractive index profile that increases linearly from the interior core/cladding boundary to the exterior core/cladding boundary.

With appropriately selected thicknesses for side cladding layer 441 and side cladding 442 of the asymmetric curved waveguide 40, the effective refractive index slope brought on by the curvature may be partially compensated for by the effective refractive index slope brought on by the asymmetric side cladding layers. It will be appreciated that the degree of sloping of the effective refractive index brought on by the curvature of the asymmetric curved waveguide 40 at a given position along the waveguide depends on the radius of curvature at that same position. Typically, the relative thicknesses between the exterior side cladding layer 441 and the interior side cladding layer 442 is defined by a ratio between 1:1.5 and 1:5. Preferably, the relative thickness ratio at a given position is determined in dependence on the radius of curvature of the waveguide 40 at said given position.

Figure 22:
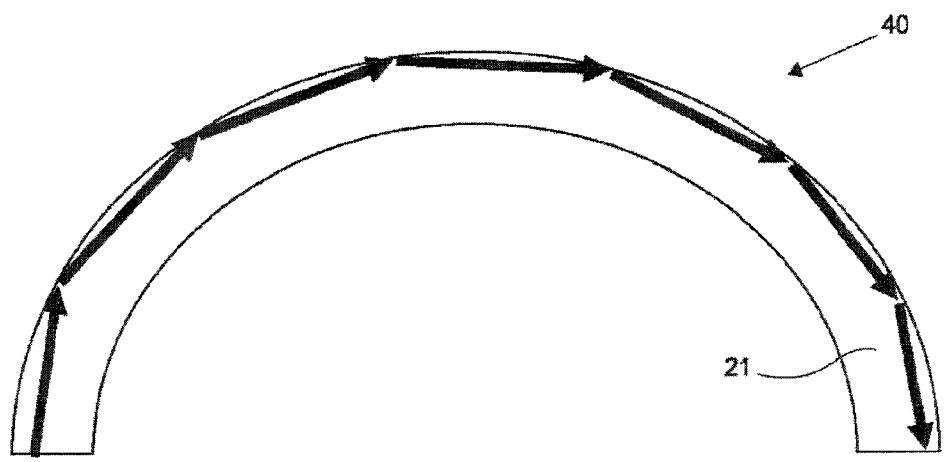
FIG. 22 shows a schematic representation of a whispering gallery mode of a curved waveguide.

It was proposed by Smit et al. that by introducing a displacement in the core of the waveguide at the transitional point between a straight portion and a curved portion of the waveguide, the spatial overlap between the mode profiles of the two portions may be improved, thus reducing coupling losses. It was also shown that, in certain arrangements, such a displaced core can be further exploited such that the optical signal couples to the Whispering Gallery Mode (WGM) of the curved portion of the waveguide. Referring to FIG. 22, a WGM is a low-loss optical mode confined to the exterior side of a waveguide such that an optical signal coupled to this mode propagates solely along the exterior core/cladding boundary of the waveguide. That is to say, the interior core/cladding boundary would not affect signal propagation.

Figure 23:
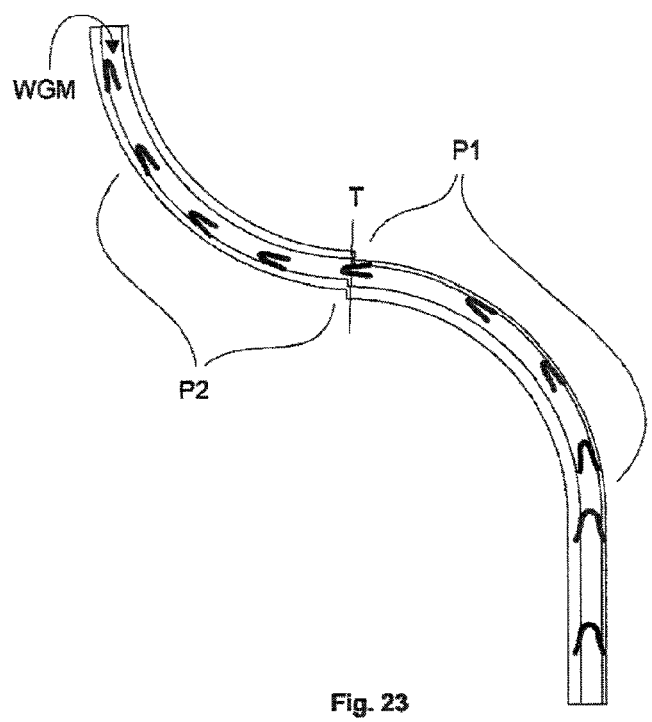
FIG. 23 shows a schematic representation of an optical signal propagating along one portion of an asymmetric curved waveguide coupling to the whispering gallery mode of an adjoining portion of the asymmetric curved waveguide.

In the embodiment of FIG. 23, an example of an asymmetric curved waveguide 40 with asymmetric side cladding layers and a displaced core is shown. In this example, the asymmetric curved waveguide 40 having a core 21 and side cladding layers as described above can be divided into a first curved portion, P1, and a connecting second portion, P2, where a portion is defined as an unbroken length of the asymmetric curved waveguide 40. In the example of FIG. 23, the second portion P2 is also a curved portion. However, it will be appreciated that the second portion P2 may or may not be curved.

As shown in FIG. 23, the centres of curvature of first curved portion P1 and second curved portion P2 are located on opposite sides of the waveguide, and the thicknesses of the side cladding layers are arranged accordingly as described above. Furthermore, a point of transition, T, is defined to be the point where first curved portion P1 terminates and where second curved portion P2 begins. At point T, the core 21 of first curved portion P1 is displaced in a transverse direction in relation to the core 21 of second curved portion P2 such that the exterior side of first curved portion P1 is displaced towards the exterior side of second curved portion P2. The displacement of the core 21 at point T allows an optical signal propagating along first curved portion P1 to couple to the WGM of second curved portion P2 as it propagates from first curved portion P1 to second curved portion P2. In this arrangement, the coupling of the optical signal to the WGM further reduces propagation losses in addition to the reduction afforded by the provisions of a displaced core and asymmetric side cladding layers.

It will be appreciated that the asymmetric curved waveguide 40 may include one or more connected portions with one or more points of transition, and that the radius of curvature of a curved portion may or may not be constant. It will also be appreciated that the radius of curvature may or may not differ between individual curved portions. Furthermore, it will also be appreciated that the displacement of the core 41 of one curved portion in relation to a connecting portion is in dependence on the location of the centres of curvature and the radii of curvature.

Figure 24:
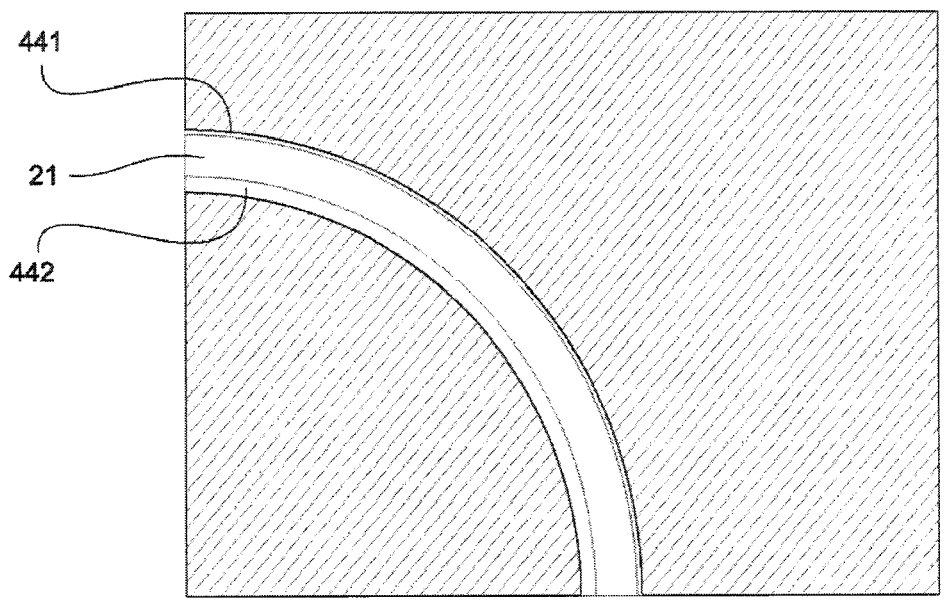
FIGS. 24 and 25 show plan views of asymmetric curved waveguides having one and two curved portions respectively.
Figure 25:
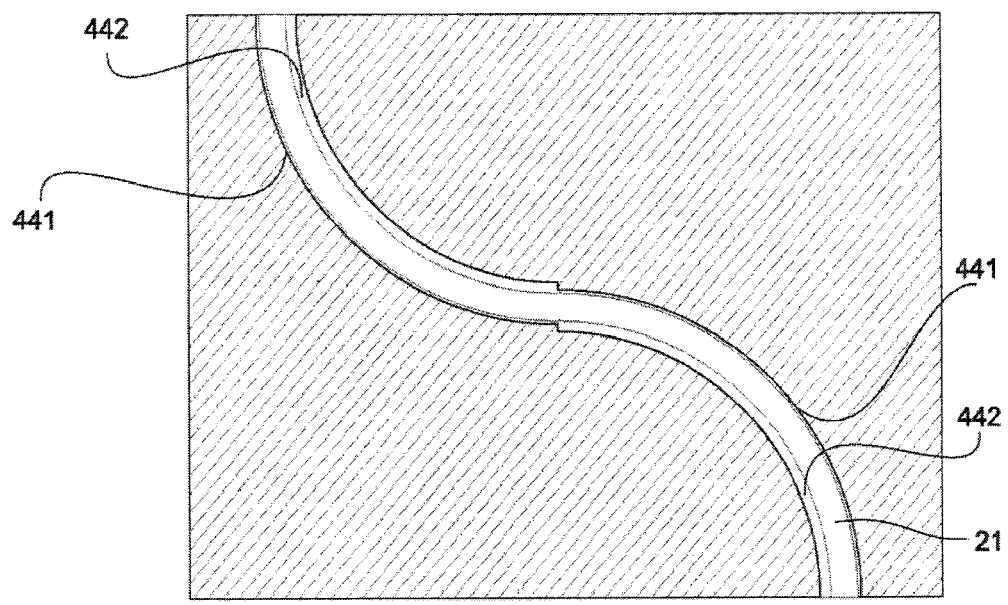

As with the previously described symmetric optical polymer waveguide 20, practical applications of the asymmetric curved waveguide 40 of the above embodiment typically involve forming multiple waveguides on an optical PCB. In one embodiment, an optical PCB is provided on which one or more asymmetric curved waveguides 40 are formed, similar to that shown in FIG. 13. In this example, the individual asymmetric curved waveguides 40 are separated by air. In another example, similar to those shown in FIGS. 17 and 18, the individual asymmetric curved waveguides 40 are separated by a low refractive index material with a refractive index substantially lower than that of the cladding 42. FIGS. 24 and 25 show plan views of examples of optical PCBs including asymmetric curved waveguides 40 having one and two curved portions respectively.

It may additionally be desirable to protect the asymmetric curved waveguides 40 of the above described embodiments from damage or contamination such as dirt and other particles. Accordingly, in one embodiment, a protective superstrate 31 is provided over the one or more asymmetric curved waveguides 40. The protective superstrate 31 is typically of a flexible material such as kapton polyimide. Preferably, the superstrate 31 is formed from a transparent material to allow for visual inspection of the waveguide 40. In one example of this embodiment, the individual asymmetric curved waveguides 40 formed on the optical PCB are separated by air in a similar fashion as that shown in and described with reference to FIG. 19. In another example of this embodiment, the individual asymmetric curved waveguides 40 formed on the optical PCB are separated by a low refractive index material with a refractive index substantially lower than that of the cladding 42 in a similar fashion as that shown in and described with reference to FIG. 20.

It will be appreciated that the fabrication processes described in FIGS. 3 to 12 are adapted to fabricate an optical PCB of the above described embodiments by adapting appropriately patterned photolithographic masks Alternatively, a conventional photolithographic mask may be used but positioned in a skewed or offset manner with respect to the core 41 of the asymmetric curved waveguide 40 such that asymmetric side cladding layers will be formed upon irradiation of the photolithographic mask.

Figure 26:
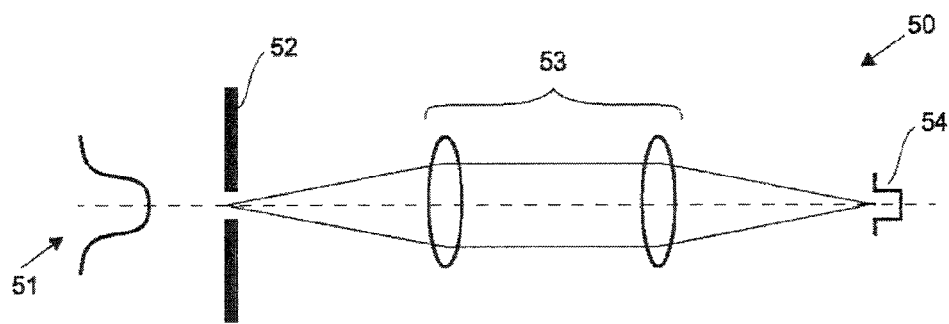
FIG. 26 shows a schematic representation of a laser beam shaping system employed for Laser Direct Imaging.

As an alternative to photolithography, the curing of the core 41 and cladding 42 may be carried out by Laser Direct Imaging. FIG. 26 shows a schematic of a typical Laser Direct Imaging system 50. As shown in this figure, the system includes a source of radiation 51 typically a laser source with a Gaussian beam profile, an aperture 52, and a beam shaping system 53 which may include components such as lenses, adaptive optics, and filters. In some examples of Laser Direct Imaging systems, the components of the system are optimized so that the intensity profile of the output beam 54 is substantially in the shape of a top hat or any other shape that has a flat intensity profile over regions corresponding to the core 41 or the cladding 42 of the asymmetric curved waveguide 40. This output beam 54 may then be directed at the required areas of the uncured layers for core and cladding material.

In some embodiments, the refractive index of the core 41, or the cladding 42, or both are non-uniform in the transverse direction. Typically, the refractive indices of the materials used to form the core 41 and cladding 42 of the asymmetric curved waveguide 40 are dependent on the dosage and/or wavelength of UV radiation to which the materials are exposed during the curing process. FIGS. 27 to 33 show modified curing stages of the photolithographic process for forming the core 41 and cladding 42 of an asymmetric curved waveguide 40 with non-uniform refractive indices on an optical PCB. It will be appreciated that the provision of a core or a cladding having non-uniform refractive index may also be applied to the symmetric optical polymer waveguide 20 of FIG. 2.

Figure 27:
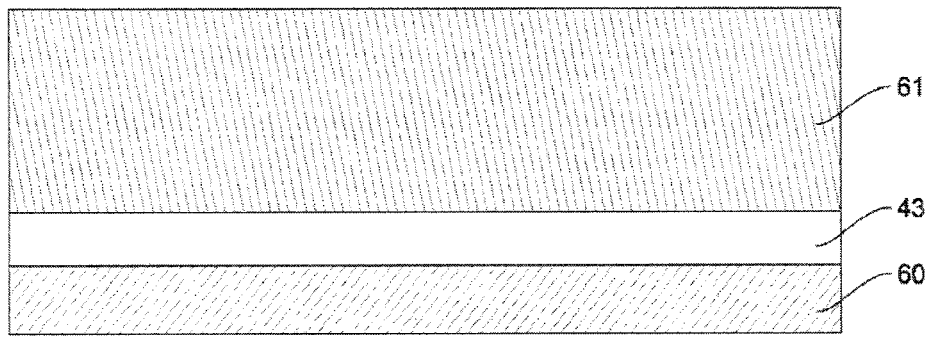
FIGS. 27 to 33B show various modified curing stages of a photolithographic process for fabricating an asymmetric curved waveguide with a core and cladding of non-uniform refractive indices and a symmetric optical polymer waveguide with a core and cladding of non-uniform refractive indices.
Figure 28:
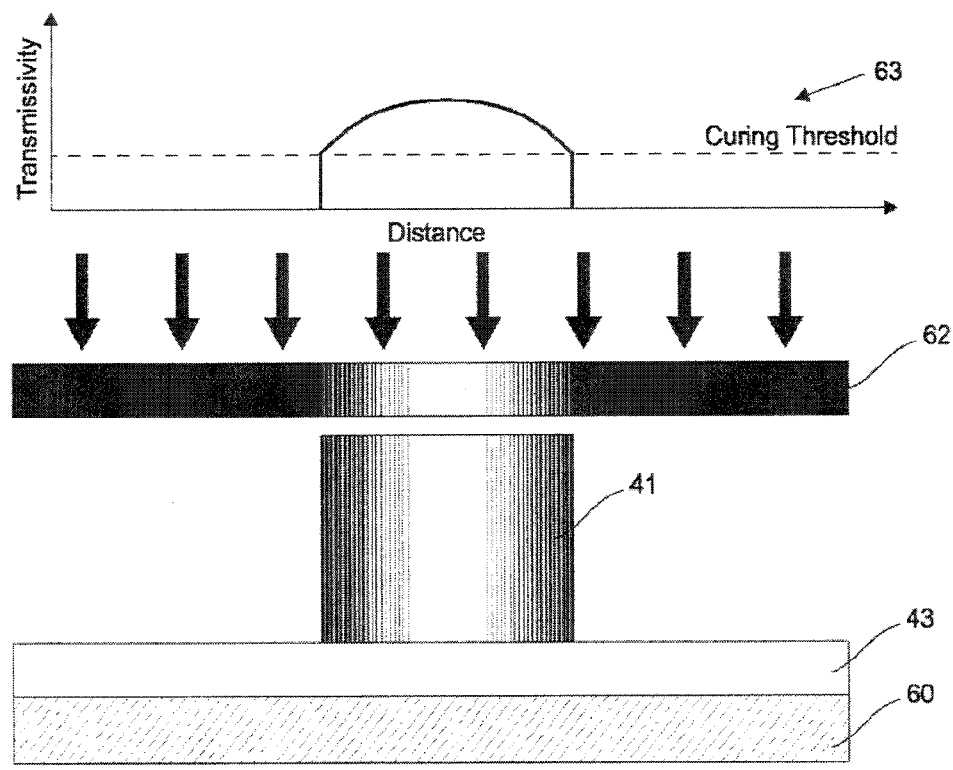
Figure 29:
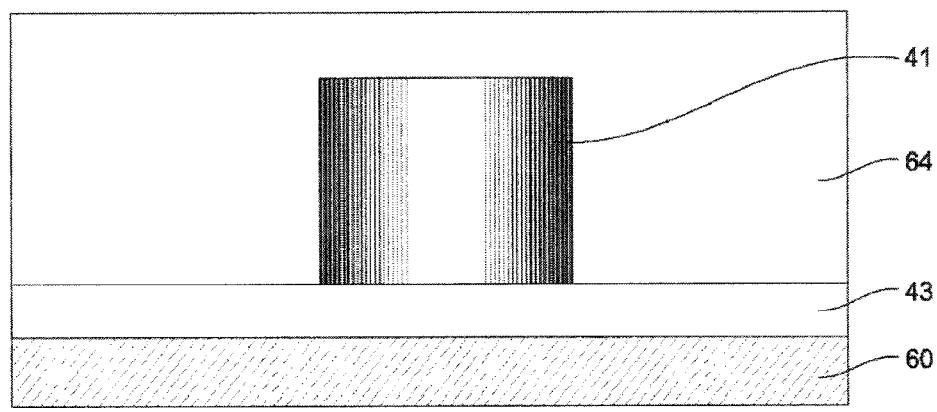

Referring to FIG. 27, a structure is provided having a substrate 60 on which a cured lower cladding layer 43 and a layer 61 of uncured core material are formed as described above. In FIG. 28, a suitably patterned grey scale photolithographic mask 62 having a transmission function 63 as shown is provided above the layer 61 of uncured core material through which the structure is exposed to UV radiation. This forms a partially cured layer of core material where areas corresponding to the core 41 of the asymmetric curved waveguide 40 are cured to varying degrees giving rise to varying degrees of polymer crosslinking in response to the radiation and therefore a varying refractive index profile, and the remaining unwanted areas uncured.

In this example, the transmission function 63 is as shown in FIG. 28. However, it will be appreciated that the transmission function may be of any shape that has an amplitude greater than the curing threshold of the core material over regions of the photolithographic mask 62 corresponding to the asymmetric curved waveguide 40, and zero elsewhere. The curing threshold is defined as the minimum intensity of the curing radiation require for the whole core to be cured. That is to say, exposure to curing radiation below the curing threshold will ultimately result in a core that is of an undesirable shape. In the remaining processes described below, unless otherwise stated, the curing radiation used is also of an intensity greater than the curing threshold of the material concerned. It will also be appreciated that the core 21 of the symmetric optical polymer waveguide 20 may also be cured in a similar manner.

The unwanted areas of the partially cured layer of core material may again be removed by various means such as chemical etching to form the core 41 of the asymmetric curved waveguide 40. Next, in FIG. 29, a layer 64 of uncured cladding material is formed above the core 41 and lower cladding layer 43.

Figure 30:
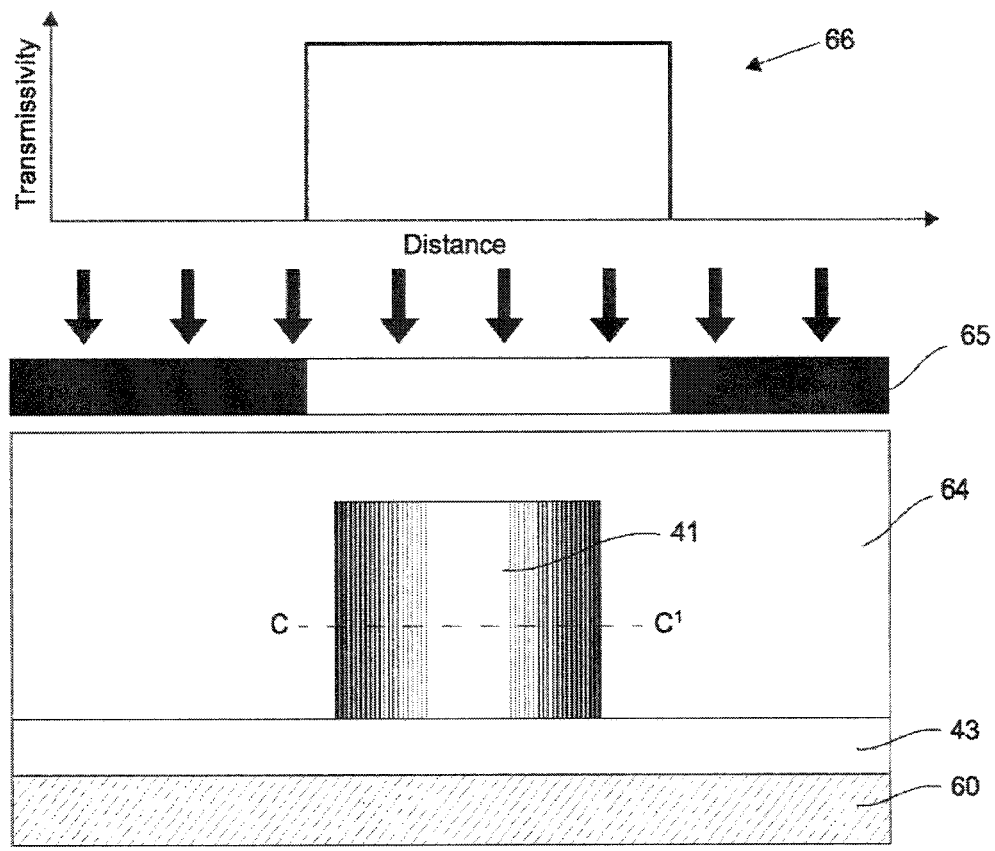

In one example, shown in FIG. 30, a simple two tone photolithographic mask 65 having a transmission function 66 as shown in the figure is provided above the layer 64 of uncured cladding material. The structure is exposed to UV radiation through the photolithographic mask 65 to form a layer of partially cured cladding material with regions corresponding to the upper cladding layer 44 of the asymmetric curved waveguide 40 cured, and the remaining unwanted areas uncured. In this example, the transmission function 66 is substantially of the shape of a top hat. However, it will be appreciated that the transmission function 66 may be of any other shape that has a flat transmission function with amplitude greater than the curing threshold of the cladding material over regions corresponding to the cladding 42 of the asymmetric curved waveguide 40, and zero elsewhere. In this example, the thicknesses of the side cladding layers are not the same. The cladding on the right (the C' side) is thicker than that on the left (the C side).

Figure 30B:
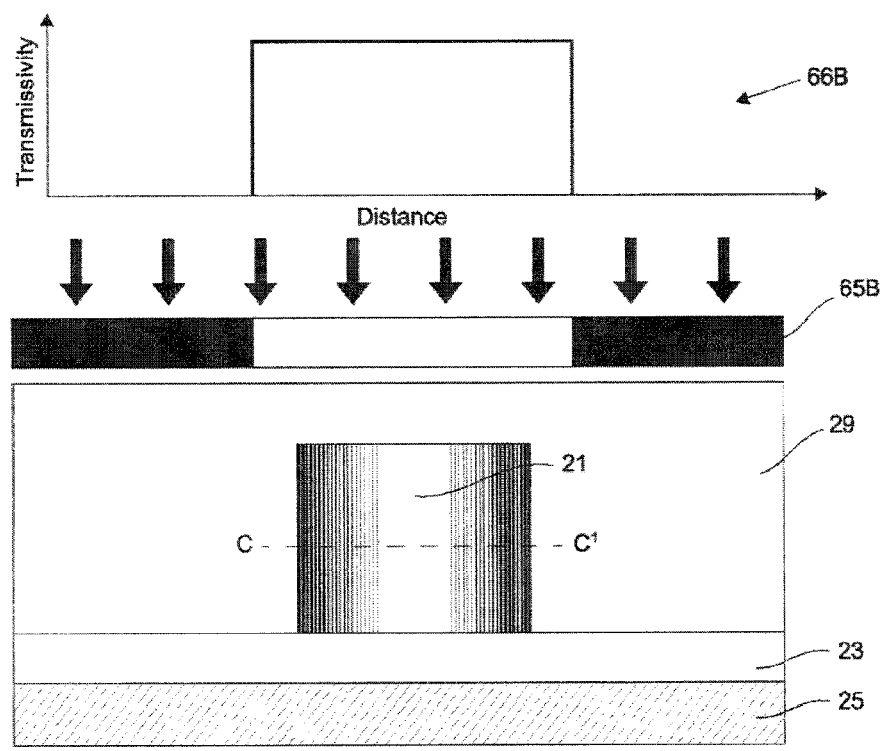

FIG. 30B shows a variation of FIG. 30 for forming the cladding 22 of a symmetric optical polymer waveguide 20 having a core 21 with non-uniform refractive index. In this figure, a structure having a substrate 25 is shown on which there is provided a cured lower cladding layer 23, a core 21 having non-uniform refractive index as described above, and a layer 29 of uncured cladding material. A photolithographic mask 65B with a transmission function 66B as shown is provided above the layer 29 of uncured layer of cladding material. The transmission function 66B is displaced transversely with respect to the transmission function 66 of FIG. 30 such that when the structure is exposed to UV radiation through the photolithographic mask 65B, a partially cured layer of cladding material is formed with regions corresponding to the upper cladding layer 24 of the symmetric optical polymer waveguide 20 cured, and the remaining unwanted areas uncured. In this example, the thicknesses of the side cladding layers are substantially the same.

Figure 31:
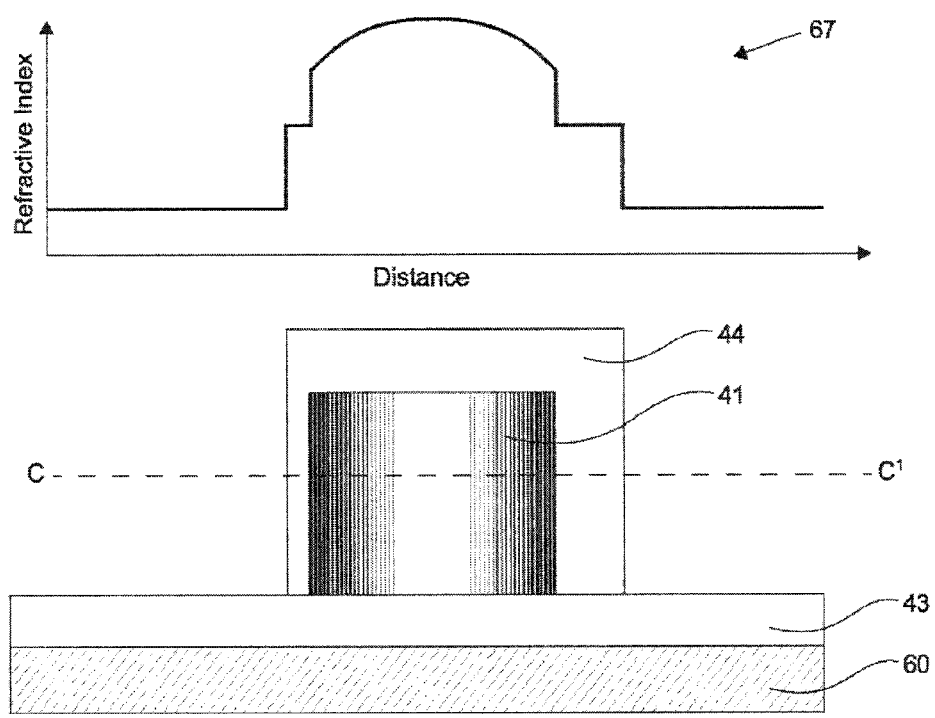

The unwanted areas of the layer of partially cured cladding material shown in FIG. 30 may again be removed by various means such as chemical etching, to form the structured cladding 42 of the asymmetric curved waveguide 40 with a refractive index profile 67 as shown in FIG. 31. In this example, the refractive index of the core 41 is non-uniform in the direction along the line CC', whilst the refractive index of the side cladding layers remains uniform.

Figure 31B:
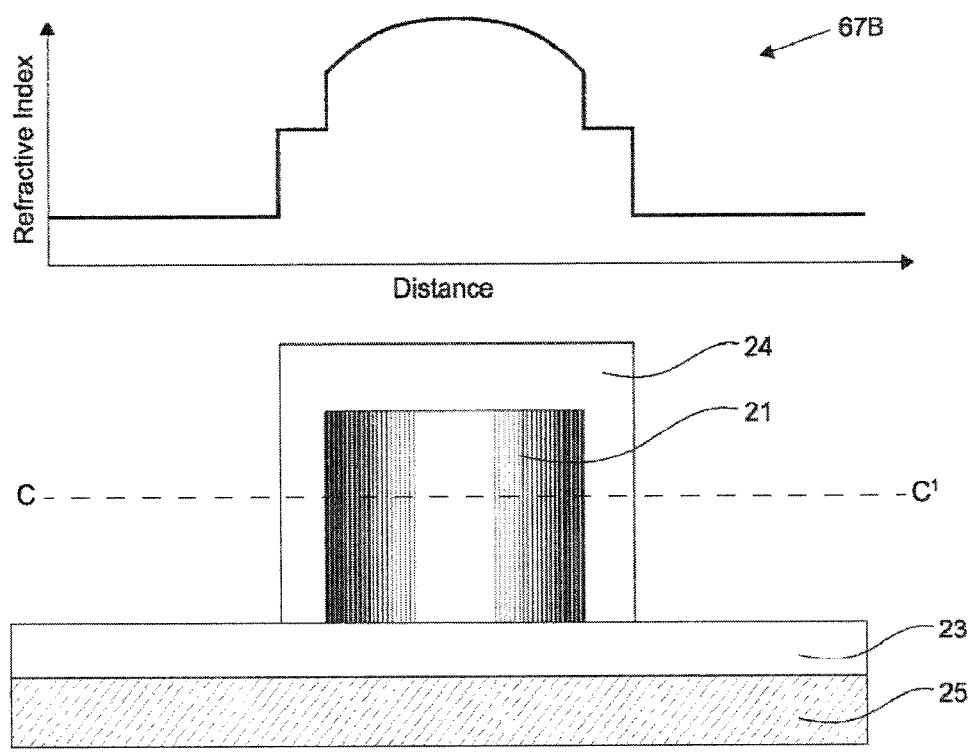

The unwanted areas of the layer of partially cured cladding material shown in FIG. 30B may also be removed by various means such as chemical etching, to form the structured cladding 22 of the symmetric optical polymer waveguide 20 with a refractive index profile 67B as shown in FIG. 31B. In this example, the refractive index of the core 21 is non-uniform in the direction along the line CC', whilst the refractive index of the side cladding layers remains uniform.

Figure 32:
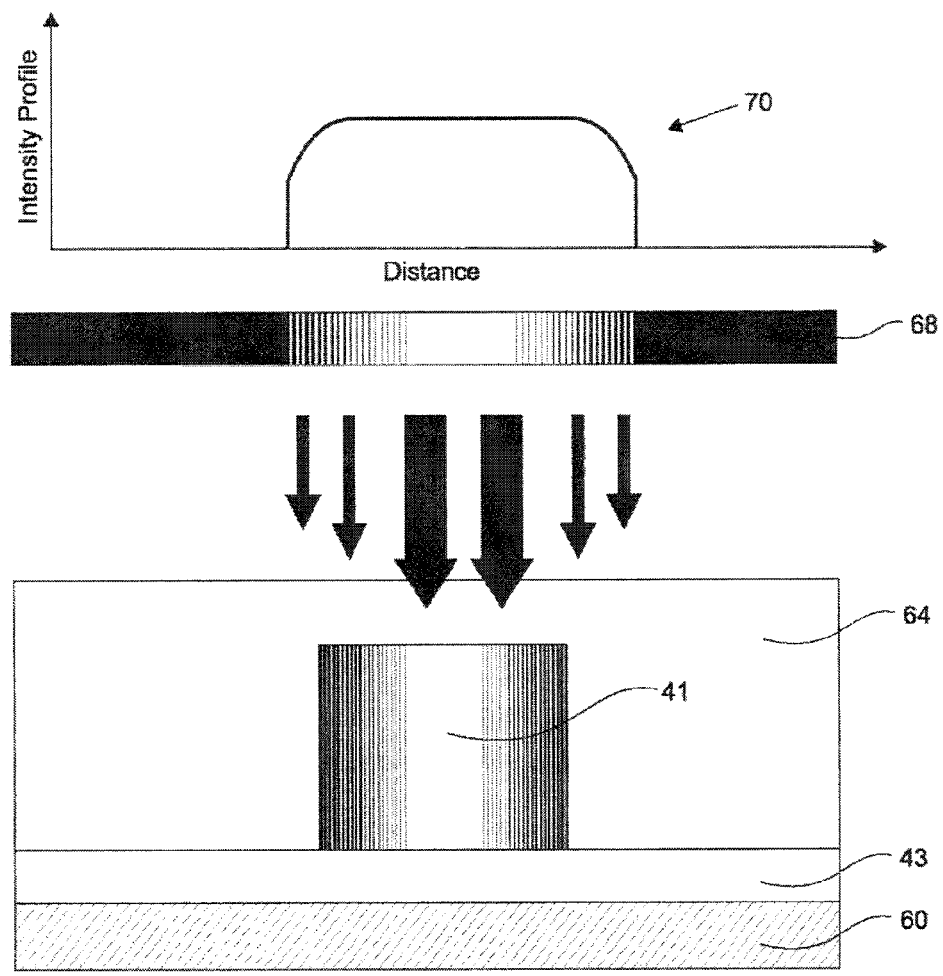
Figure 33:
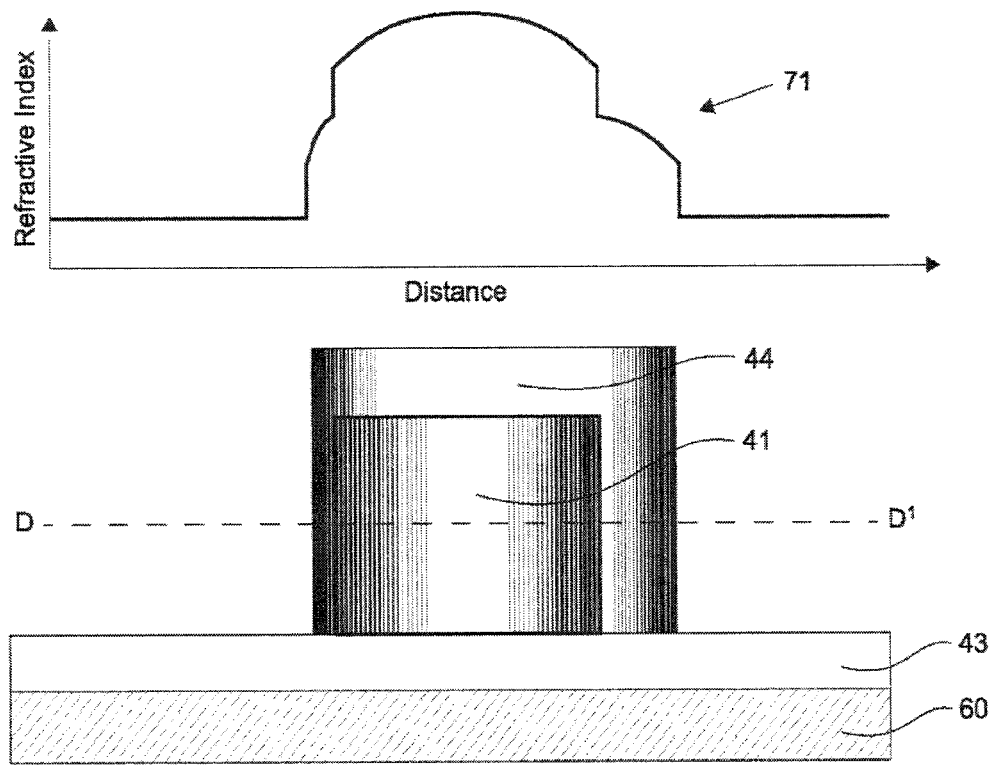

In another example, shown in FIG. 32, the two tone photolithographic mask 65 of FIG. 30 is replaced by a grey scale photolithographic mask 68 with a transmission function 70 as shown. In this example, the transmission function 70 is as shown in FIG. 32. However, it will be appreciated that the transmission function may of any other shape that is flat over the regions corresponding to the core 41, non-zero over the regions corresponding to side cladding layer 441 and side cladding layer 442, and zero elsewhere. This forms an asymmetric curved waveguide 40 with a refractive index profile 71 as shown in FIG. 33. In this example, the refractive index of the core 41 and the side cladding layers are non-uniform in the direction along the line DD'.

Figure 32B:
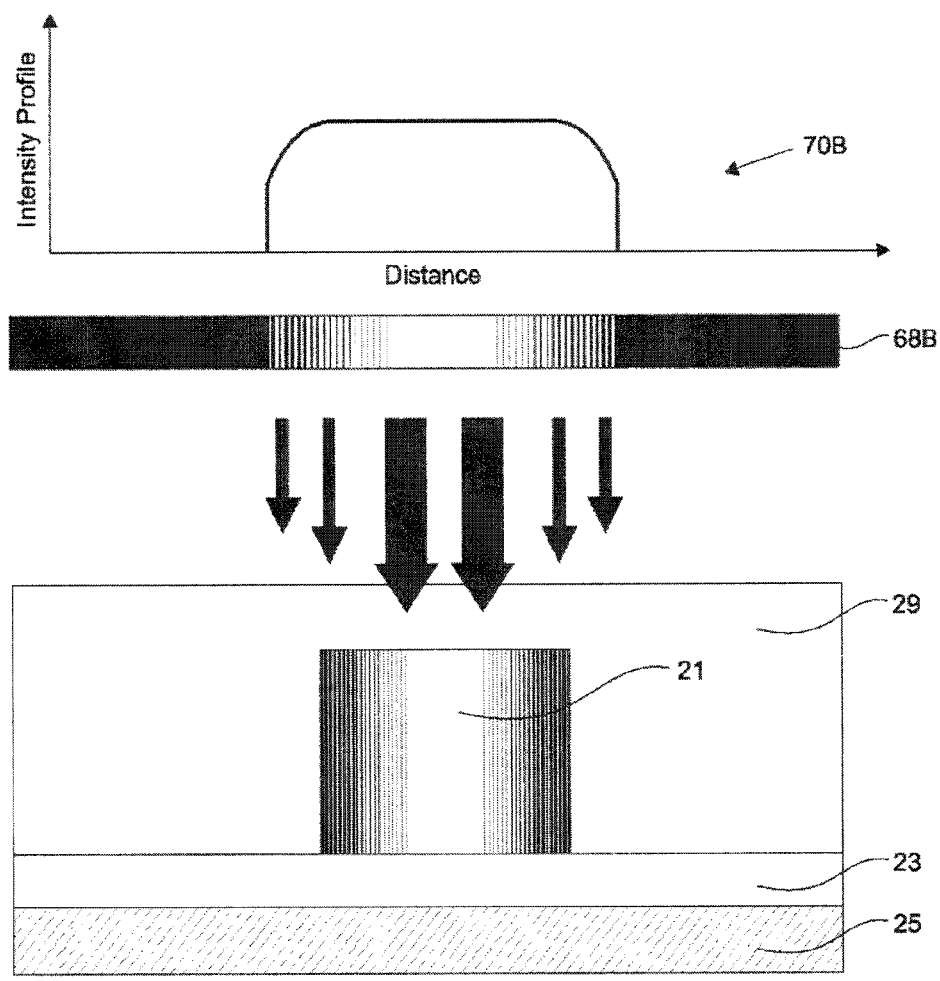
Figure 33B:
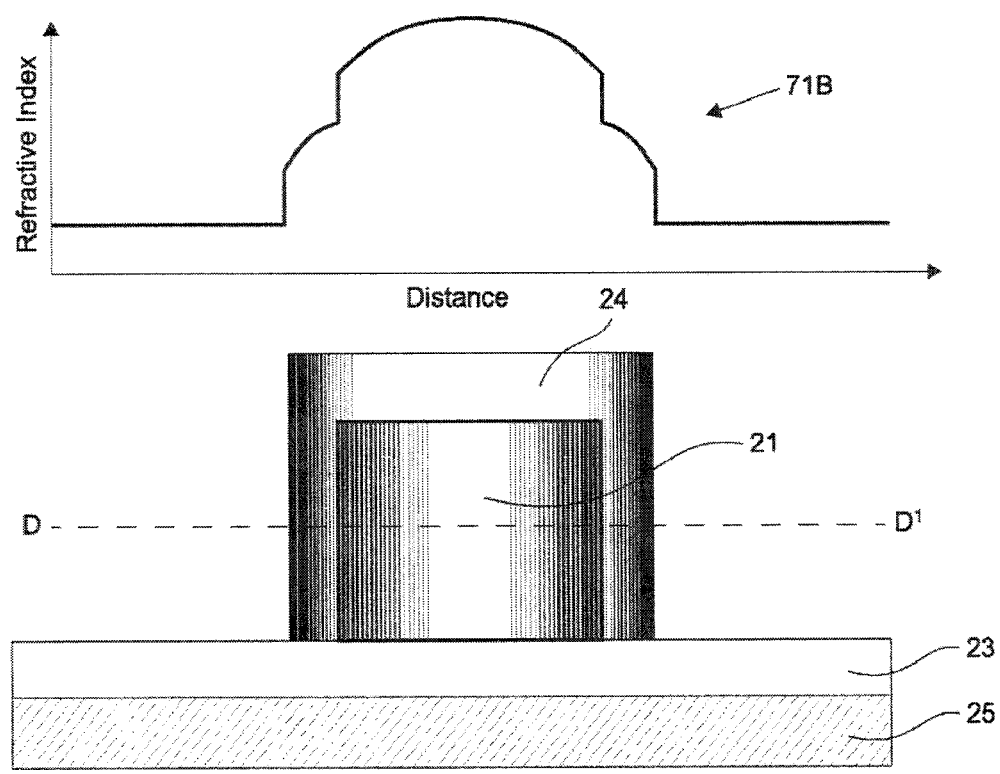

FIG. 32B shows a variation of FIG. 32 for forming the cladding 22 of a symmetric optical polymer waveguide 20 where the core 21 and the cladding 22 both have a non-uniform refractive index. In this figure, a structure having a substrate 25 is shown on which there is provided a cured lower cladding layer 23, a core 21 having non-uniform refractive index as described above, and a layer 29 of uncured cladding material. A photolithographic mask 68B with a transmission function 70B as shown is provided above the layer 29 of uncured layer of cladding material. The transmission function 68B is displaced transversely with respect to the transmission function 68 of FIG. 32 such that when the structure is exposed to UV radiation through the photolithographic mask 68B, a symmetric optical polymer waveguide 20 with a refractive index profile 71 B as shown in FIG. 33B is formed. In this example, the thicknesses of the side cladding layers are substantially the same, and the refractive index of the core 21 and the side cladding layers are non-uniform in the direction along the line DD'.

As described above, the curing of the core 41 and the cladding 42 of an asymmetric curved waveguide 40, and the core 21 and the cladding 22 of a symmetric optical polymer waveguide 20 may alternatively be performed by Laser Direct Imaging. US-A-2009/0218519 describes a system and associated method capable of creating a region of refractive index change, in three dimensions, in a photopolymer for the fabrication of optical structures in diffusion-mediated photopolymer that are confined transversely and longitudinally with respect to the writing beam of the system, at any depth within the volume of the photopolymer.

Figure 38:
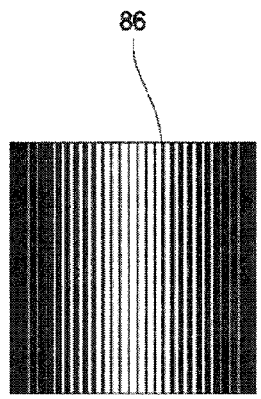
FIGS. 38 and 39 show schematic representations of graded intensity filters for use in Laser Direct Imaging.
Figure 39:
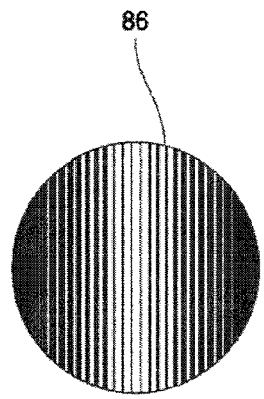

FIGS. 34 to 37 show variations of the Laser Direct Imaging system 80 for forming the core 41 and cladding 42 of an asymmetric curved waveguide 40, and the core 21 and the cladding 22 of a symmetric optical polymer waveguide 20 with non-uniform refractive indices on an optical PCB. In these figures, the Laser Direct Imaging system 80 includes a source of radiation 81 typically a laser source with a Gaussian beam profile, an aperture 82, a beam shaping system 83 which may include components such as lenses and/or adaptive optics, and a suitably patterned graded intensity filter 85 such as those shown in FIGS. 38 and 39.

The graded intensity filter 85 may be placed at various positions within the Laser Direct Imaging system 80 to achieve an output beam with non-uniform intensity. In one example of the Laser Direct Imaging system 80, the graded intensity filter 85 may be a passive component. In another example, the graded intensity filter 85 may be an active component such as a dynamically controlled filter where the transmission function of the filter is user-programmable.

Figure 34:
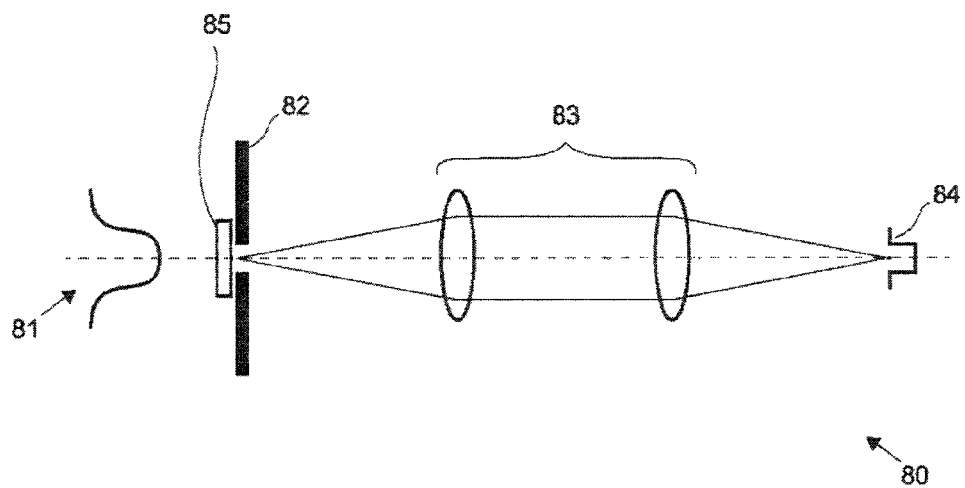
FIGS. 34 to 37 show schematics of modified laser beam shaping systems including intensity filters for modifying the laser beam intensity profile for Laser Direct Imaging for fabricating asymmetric curved waveguides and symmetric optical polymer waveguides.
Figure 35:
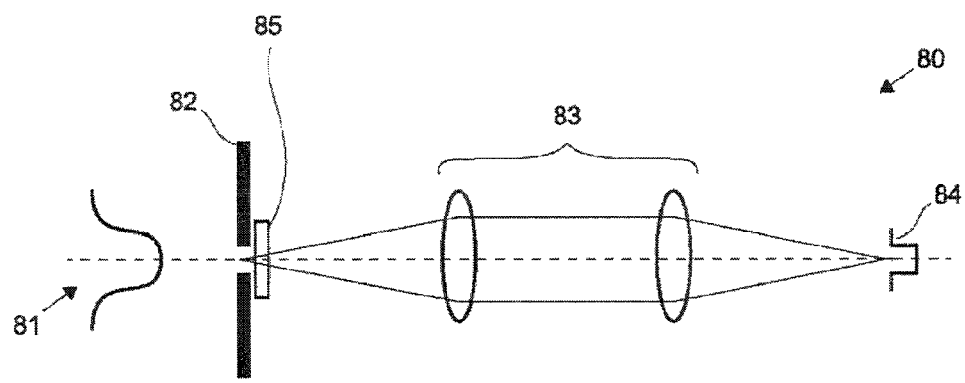
Figure 36:
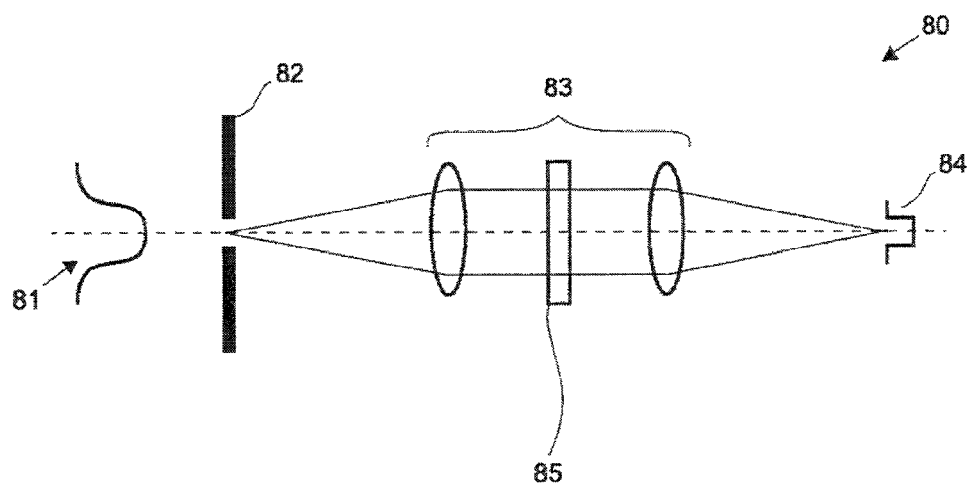
Figure 37:
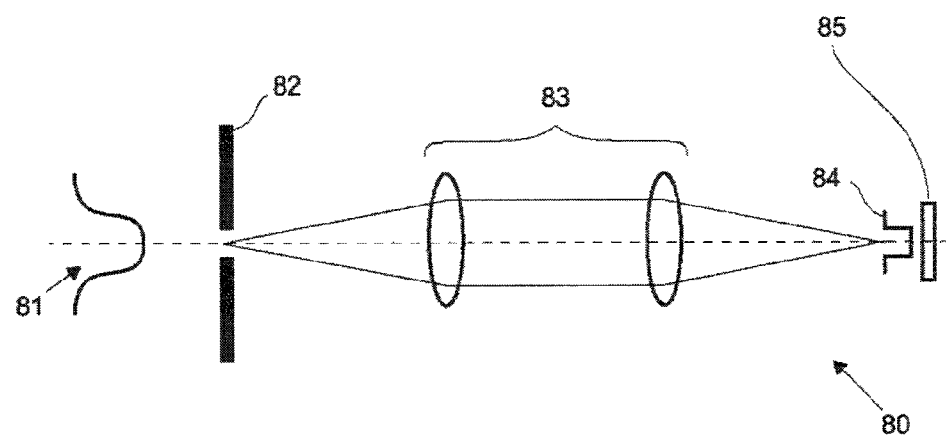

Referring to FIG. 34, the graded intensity filter 85 is provided between the input Gaussian beam 81 and the aperture 82. Referring to FIG. 35, the graded intensity filter 85 is provided between the aperture 82 and the beam shaping system 83. Referring to FIG. 36, the graded intensity filter 85, preferably a dynamically controlled filter as described above, is provided within the beam shaping system 83 at the point where the beam is fully expanded. Referring to FIG. 37, the graded intensity filter 85 is provided at the output of the Laser Direct Imaging system 80.

FIGS. 40 to 46 show modified curing stages of the Laser Direct Imaging process for forming the core 41 and cladding 42 of an asymmetric curved waveguide 40 with non-uniform refractive indices on an optical PCB using the Laser Direct Imaging systems 80 described above.

Figure 40:
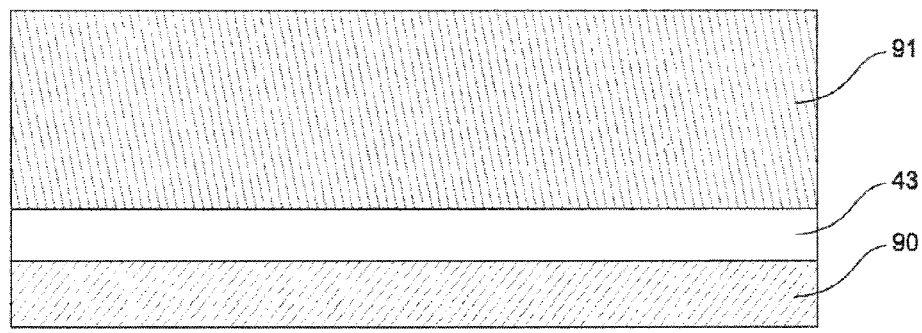
FIGS. 40 to 46B show various modified curing stages of the Laser Direct Imaging process for fabricating asymmetric curved waveguides and symmetric optical polymer waveguides with non-uniform refractive indices.
Figure 41:
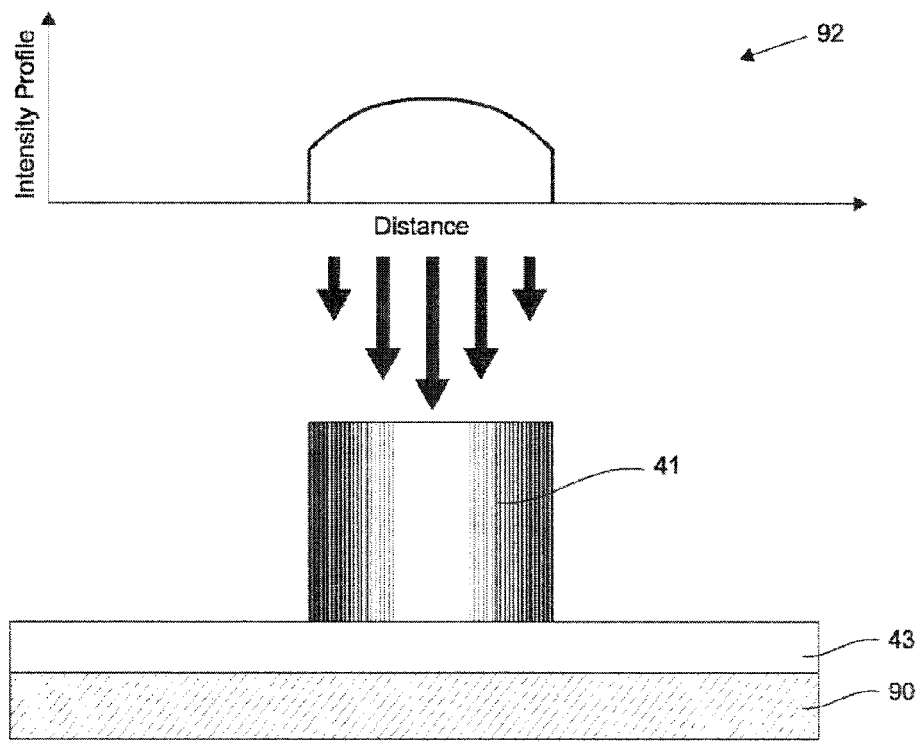
Figure 42:
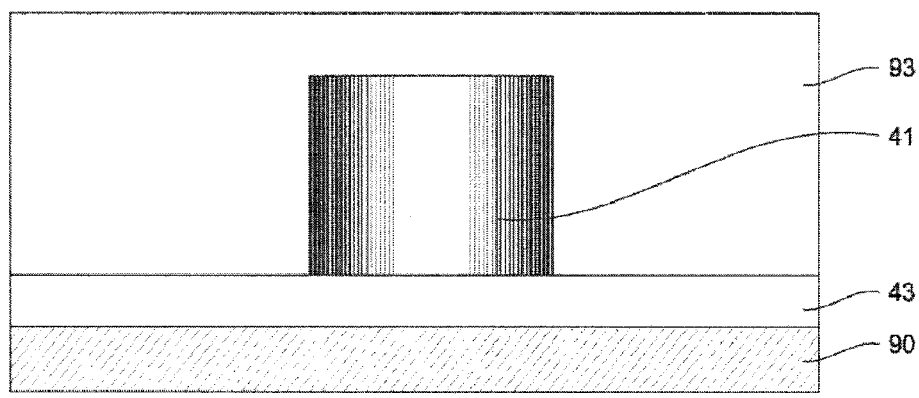

Referring to FIG. 40, a structure is provided having a substrate 90 on which a cured lower cladding layer 43 and a layer 91 of uncured core material are formed as described above. In FIG. 41, the output beam 84 having an intensity profile 92 as shown is directed at the required area of the layer 91 of uncured core material, forming a partially cured layer of core material similar to those previously described. In this example, the intensity profile 92 is as shown in FIG. 41. However, it will be appreciated that the intensity profile 92 may be of any shape that is non-zero over regions corresponding to the asymmetric curved waveguide 40, and zero elsewhere. The unwanted areas of the partially cured layer of core material may again be removed by various means such as chemical etching to form the core 41 of the asymmetric curved waveguide 40. Next, as shown in FIG. 42, a layer 93 of uncured cladding material is formed above the core 41 and lower cladding layer 43.

Figure 43:
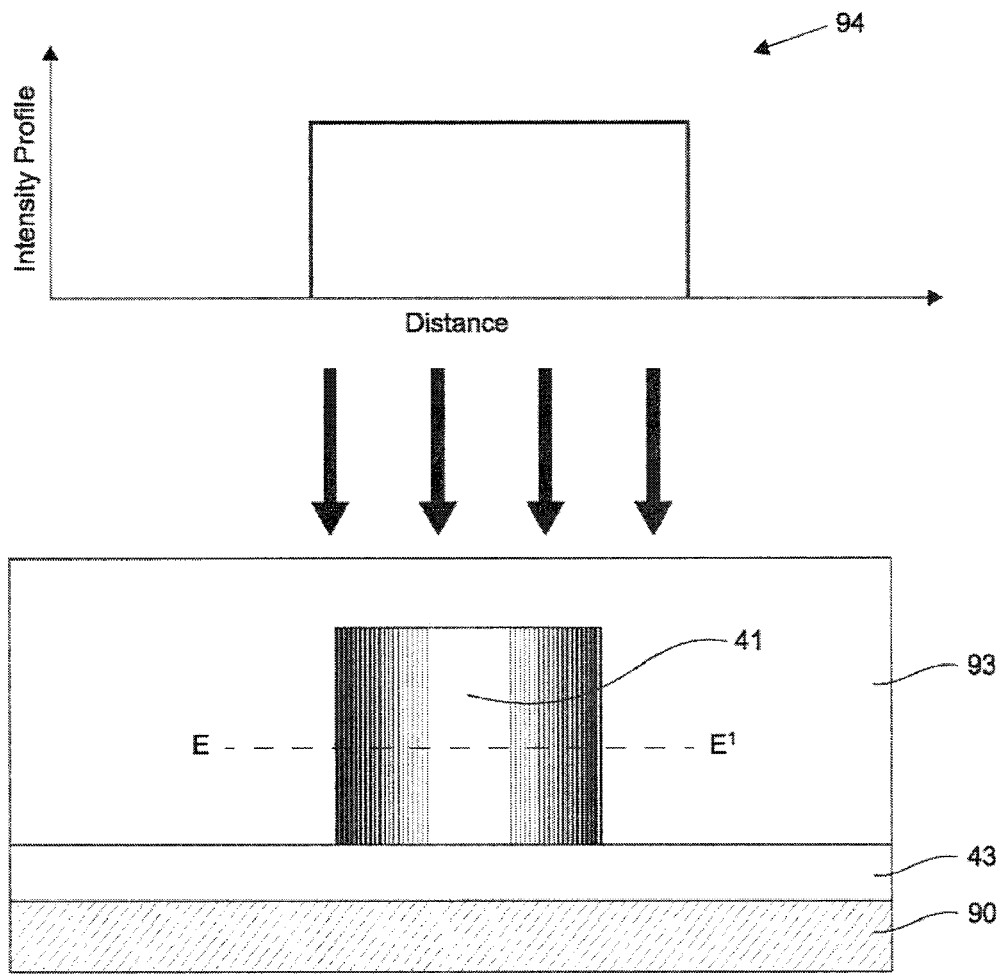

In one example, as shown in FIG. 43, the output beam 84 having an intensity profile 94 as shown is directed at the required areas of the layer 93 of uncured cladding material to form a layer of partially cured cladding material with regions corresponding to the upper cladding layer 94 of the asymmetric curved waveguide 40 cured, and the remaining unwanted areas uncured. In this example, the intensity profile 94 is substantially of the shape of a top hat. However, it will be appreciated that the intensity profile 94 may be of any other shape that has a flat intensity profile over regions corresponding to the cladding 41 of the asymmetric curved waveguide 40.

Figure 43B:
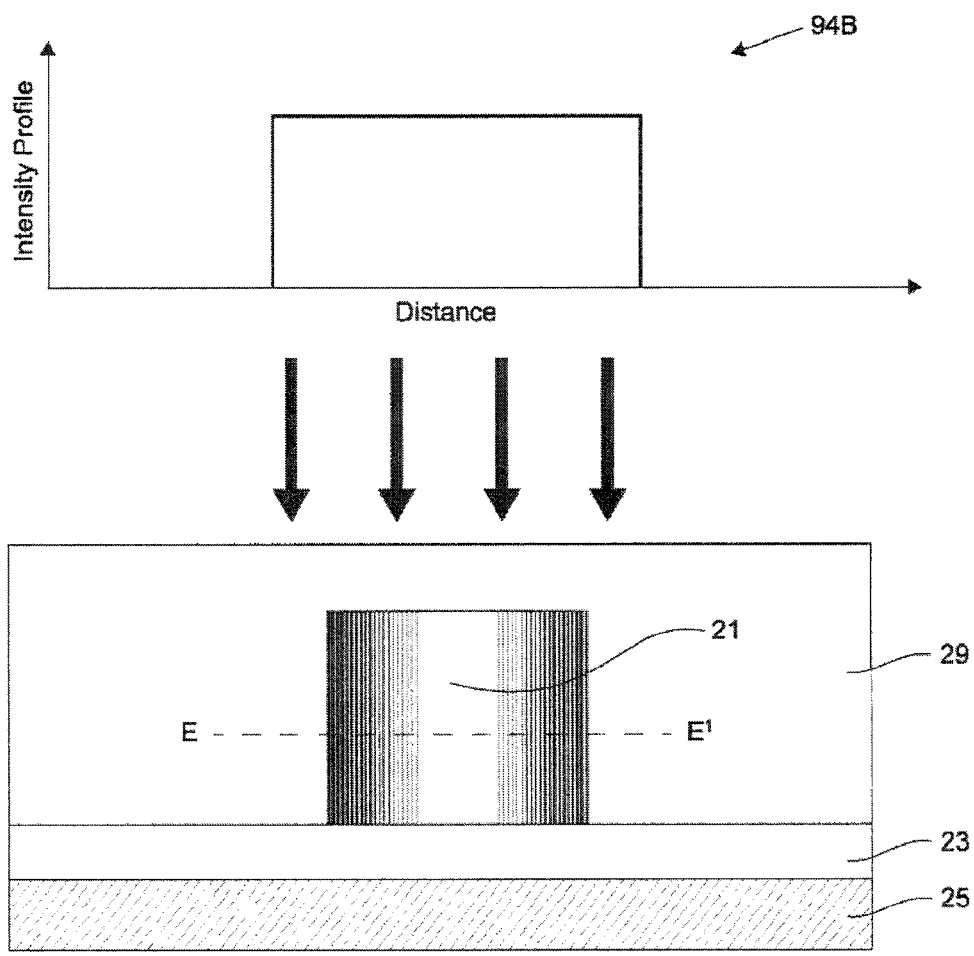
Figure 44:
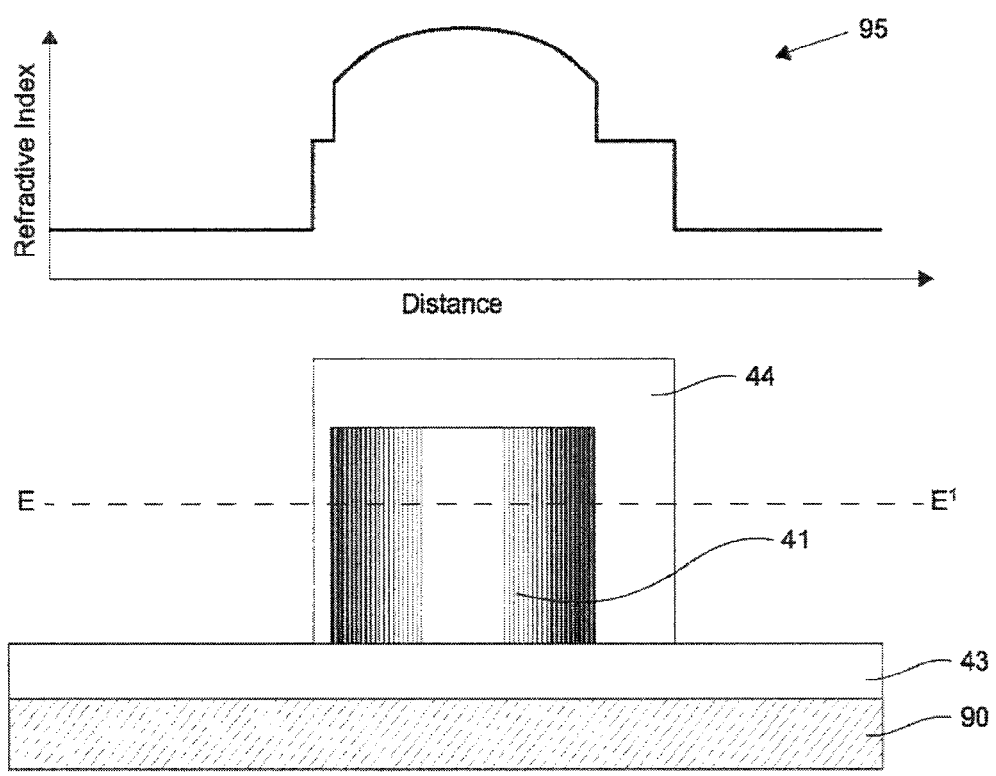

FIG. 43B shows a variation of FIG. 43 for forming the cladding 21 of a symmetric optical polymer waveguide 20 having a core 21 with non-uniform refractive index. In this figure, a structure having a substrate 25 is shown on which there is provided a cured lower cladding layer 23, a core 21 having non-uniform refractive index as described above, and a layer 29 of uncured cladding material. The output beam 84 having an intensity profile 94B as shown is directed at the required area of the layer 29 of uncured core material. The intensity profile 94B is displaced transversely with respect to the intensity profile 94 of FIG. 43 such that when the structure is exposed to the output beam 84, a partially cured layer of cladding material is formed with regions corresponding to the upper cladding layer 24 of the symmetric optical polymer waveguide 20 cured, and the remaining unwanted areas uncured. In this example, the thicknesses of the side cladding layers are substantially the same, The unwanted areas of the layer of partially cured cladding material may again be removed by various means such as chemical etching to form the structured cladding 42 of the asymmetric curved waveguide 40 with a refractive index profile 95 as shown in FIG. 44. In this example, the refractive index of the core 41 is non-uniform in the direction along the line EE', whilst the refractive index of the side cladding layers remains uniform.

Figure 44B:
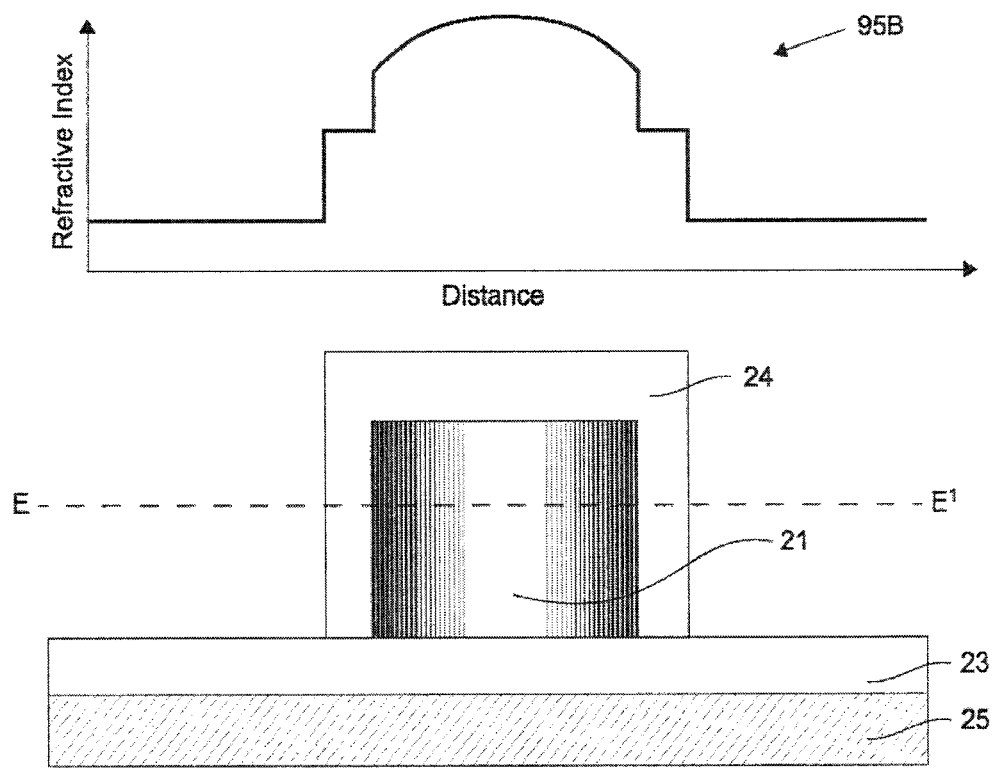

The unwanted areas of the layer of partially cured cladding material shown in FIG. 43B may also be removed by various means such as chemical etching, to form the structured cladding 22 of the symmetric optical polymer waveguide 20 with a refractive index profile 95B as shown in FIG. 44B. In this example, the refractive index of the core 21 is non-uniform in the direction along the line EE', whilst the refractive index of the side cladding layers remains uniform.

Figure 45:
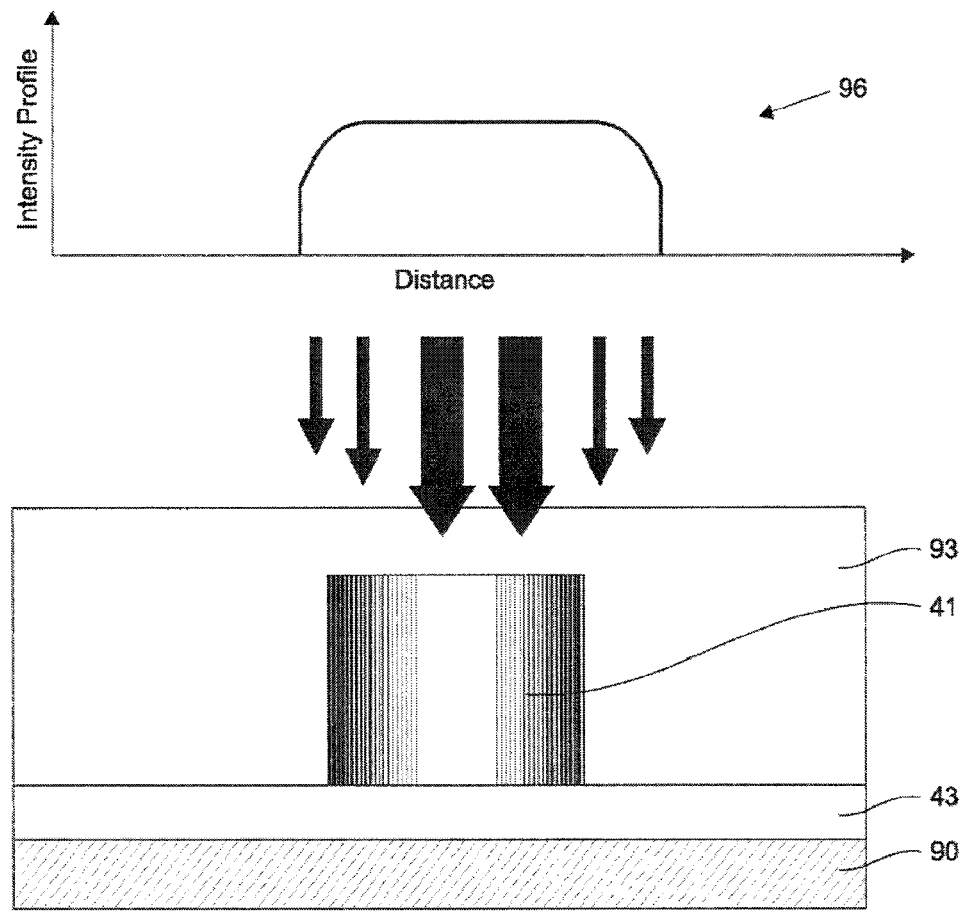
Figure 46:
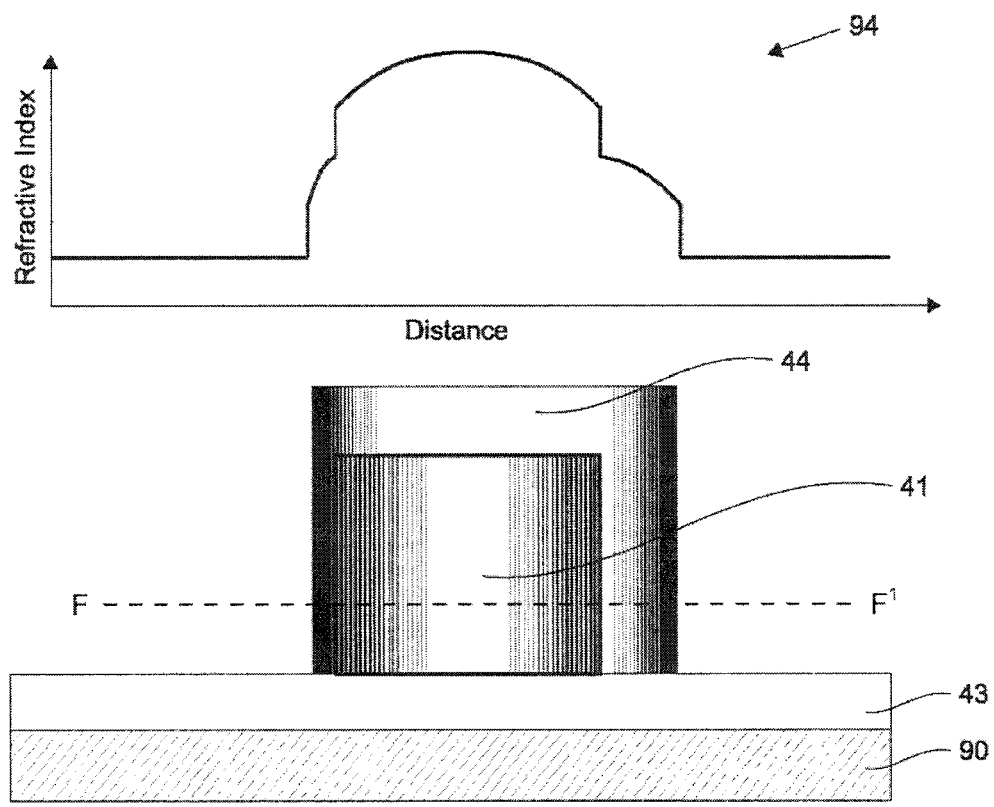

In another example, shown in FIG. 45, the output beam 84 having an intensity profile 94 is replaced by the output beam 84 having an intensity profile 96 as shown. This forms an asymmetric curved waveguide 40 with a refractive index profile 97 as shown in FIG. 46. In this example, the refractive indices of the core 41 and the two side cladding layers are non-uniform in the direction along the line FF'.

Figure 45B:
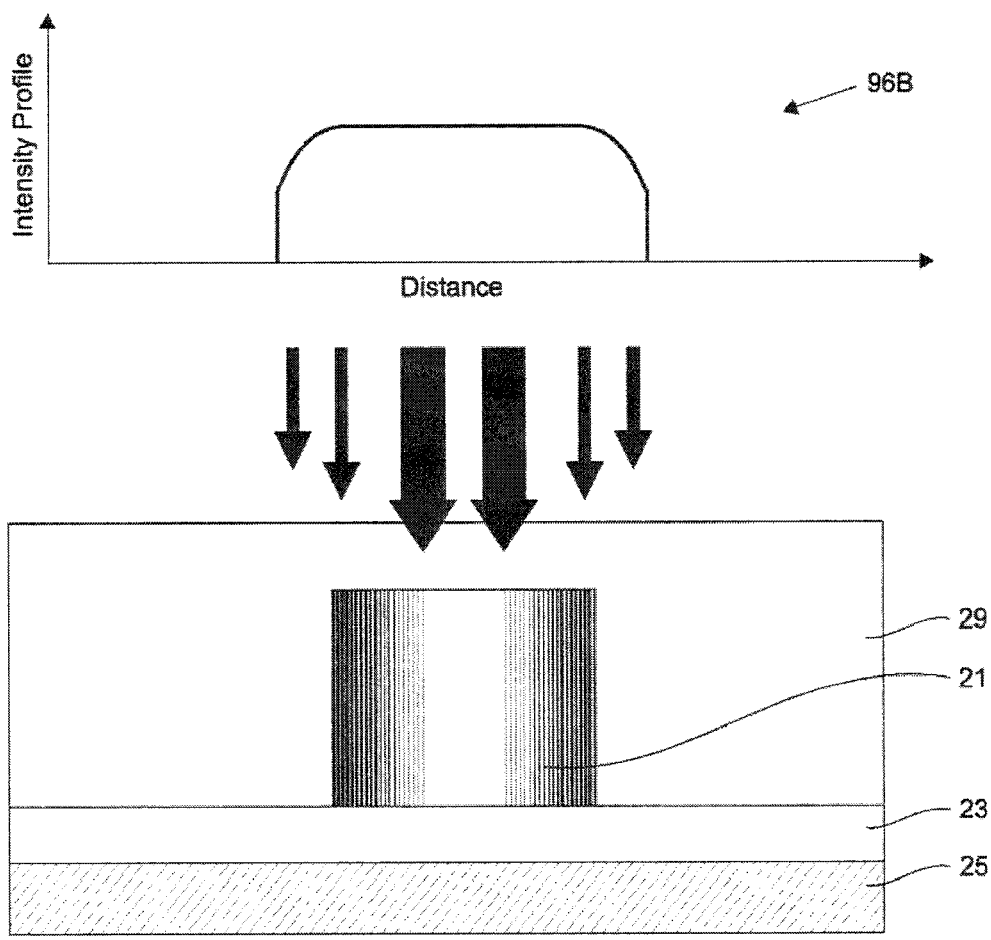
Figure 46B:
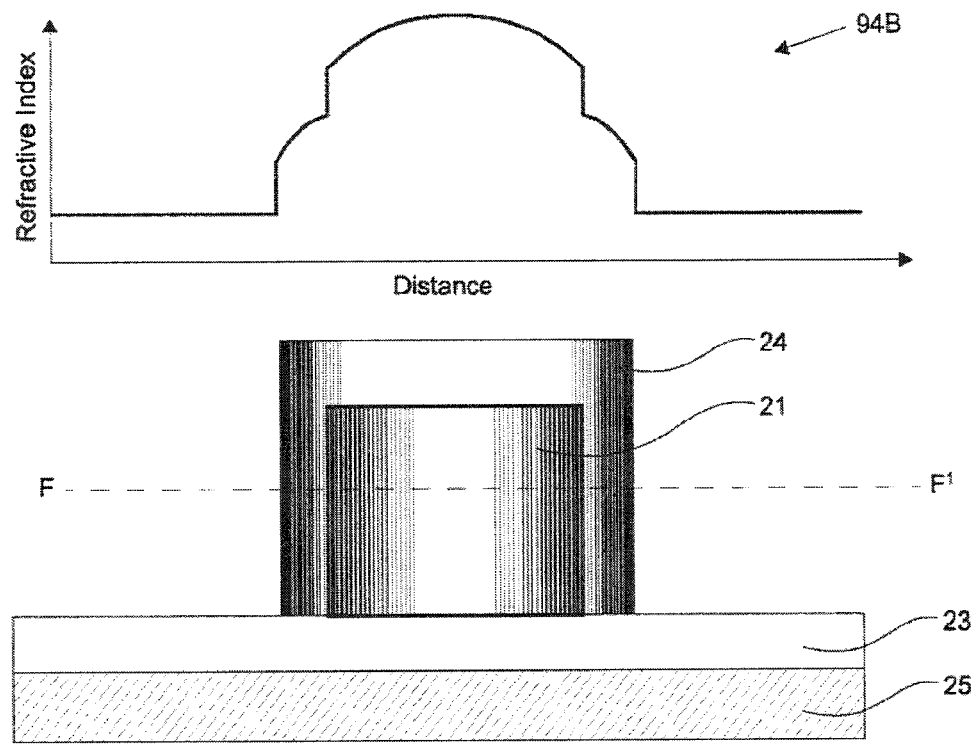

FIG. 45B shows a variation of FIG. 45 for forming the cladding 22 of a symmetric optical polymer waveguide 20 where the core 21 and the cladding 22 both have a non-uniform refractive index. In this figure, a structure having a substrate 25 is shown on which there is provided a cured lower cladding layer 23, a core 21 having non-uniform refractive index as described above, and a layer 29 of uncured cladding material. The output beam 84 having an intensity profile 96B as shown is directed at the required area of the layer 29 of uncured core material. The intensity profile 96B is displaced transversely with respect to the intensity profile 96 of FIG. 45 such that when the structure is exposed to the output beam 84, a partially cured layer of cladding material is formed with regions corresponding to the upper cladding layer 24 of the symmetric optical polymer waveguide 20 cured, and the remaining unwanted areas uncured. In this example, the thicknesses of the side cladding layers are substantially the same, The unwanted areas of the layer of partially cured cladding material may again be removed by various means such as chemical etching to form the structured cladding 22 of the asymmetric curved waveguide 40 with a refractive index profile 95 as shown in FIG. 46B. In this example, the refractive indices of the core 21 and the cladding 22 are both non-uniform in the direction along the line FF'

The methods described in FIGS. 27 to 37 and FIGS. 40 to 46B relate to the fabrication of one asymmetric curved waveguide 40 on an optical PCB and one symmetric optical polymer waveguide 20 on an optical PCB. It will be appreciated that these methods may be extended to form one or more asymmetric curved waveguide 40 on an optical PCB and one or more symmetric optical polymer waveguides 20 on an optical PCB.

Embodiments of the present invention have been described with particular reference to the examples illustrated. However, it will be appreciated that variations and modifications may be made to the examples described within the scope of the present invention.

The invention claimed is:

1. An optical waveguide comprising:
   an optical core having transverse sides, the optical core extending along a curved path;
   an optical cladding at least on the transverse sides of the optical core; and
   a low refractive index layer provided at least on the transverse sides of the optical cladding;
   wherein the physical distribution of the optical cladding on the transverse sides of the optical core is asymmetric about the centre of the optical core.

2. An optical waveguide as claimed in claim 1, wherein the optical core and the optical cladding are formed of polymer materials.

3. An optical waveguide as claimed in claim 1, further comprising a protective superstrate provided above the optical cladding.

4. An optical waveguide as claimed in claim 1, wherein the refractive index of the optical cladding is substantially higher than the refractive index of the low refractive index layer.

5. An optical waveguide as claimed in claim 1, wherein the refractive index of the optical core varies in the transverse direction.

6. An optical waveguide as claimed in claim 1, wherein the refractive index of the optical cladding varies in the transverse direction.

7. An optical waveguide as claimed in claim 1, wherein the physical distribution of the optical cladding on the transverse sides of the optical core varies along the optical waveguide.

8. An optical waveguide as claimed in claim 1, wherein the optical waveguide includes a first portion connected to a second portion, the first portion being a curved portion;
   wherein the optical cores of the connecting first and second portions are transversely displaced.

9. An optical waveguide as claimed in claim 8, wherein the second portion is a curved portion.

10. An optical printed circuit board comprising:
    a substrate; and
    one or more optical waveguides according to claim 1 provided on the substrate.

11. A method of fabricating an optical waveguide, the method comprising:
    providing an optical core having transverse sides, the optical core extending along a curved path;
    providing an optical cladding at least on the transverse sides of the optical core, and
    providing a low refractive index layer at least on the transverse sides of the optical cladding,
    wherein the physical distribution of the optical cladding on the transverse sides of the optical core is asymmetric about the centre of the core.

12. A method as claimed in claim 11, further comprising providing a protective superstrate above the optical cladding.

13. A method as claimed in claim 11, wherein the optical waveguide includes a first portion connected to a second portion, the first portion being a curved portion;
    further comprising displacing the optical cores of the connecting first and second portions transversely.

14. A method as claimed in claim 13, wherein the second portion is a curved portion.

15. A method as claimed in claim 11, further comprising structuring the optical core and the optical cladding by photolithography.

16. A method as claimed in claim 15, wherein a grey scale mask is employed in the photolithographic process.

17. A method as claimed in claim 11, further comprising curing the optical core and the optical cladding by laser direct imaging.

18. A method as claimed in claim 17, wherein the laser direct imaging process includes a laser beam of non-uniform intensity.

19. A method as claimed in claim 17, further comprising removing unwanted areas of the optical core and unwanted areas of the optical cladding by laser ablation.

20. A method of fabricating an optical printed circuit board, the method comprising:
    providing a substrate; and
    providing one or more optical waveguides according to claim 1 on the substrate.

21. A method as claimed in claim 20, further comprising structuring the optical core and the optical cladding by photolithography.

22. A method as claimed in claim 21, wherein a grey scale mask is employed in the photolithographic process.

23. A method as claimed in claim 20, further comprising curing the optical core and the optical cladding by laser direct imaging.

24. A method as claimed in claim 23, wherein the laser direct imaging process includes a laser beam of non-uniform intensity.

25. A method as claimed in claim 23, further comprising removing unwanted areas of the optical core and unwanted areas of the optical cladding by laser ablation.

26. An optical waveguide comprising:
   an optical core formed of polymer material, the optical core having transverse sides and extending along a curved path; and
   an optical cladding at least on the transverse sides, the optical cladding being formed of polymer material;
   wherein the optical cladding is structured to form a ridge-like spine and the optical core is provided within the ridge-like spine, and
   wherein a low refractive index layer is provided around the ridge-like spine of the structured optical cladding.

27. An optical waveguide according to claim 26, wherein the physical distribution of the optical cladding on the transverse sides is symmetric about the centre of the optical core.

28. An optical waveguide as claimed in claim 26, further comprising a protective superstrate provided above the optical cladding.

29. An optical waveguide as claimed in claim 26, wherein the refractive index of the optical cladding is substantially higher than the refractive index of the low refractive index layer.

30. An optical waveguide as claimed in claim 26, wherein the refractive index of the optical core varies in the transverse direction.

31. An optical waveguide as claimed in claim 26, wherein the refractive index of the optical cladding varies in the transverse direction.

32. An optical waveguide as claimed in claim 26, wherein the optical waveguide includes a first portion connected to a second portion, the first portion being a curved portion;
   wherein the optical cores of the connecting first and second portions are transversely displaced.

33. An optical waveguide as claimed in claim 32, wherein the second portion is a curved portion.

34. An optical printed circuit board comprising:
   a substrate; and
   one or more optical waveguides according to claim 26 provided on the substrate.

35. An optical waveguide comprising:
   an optical core having transverse sides, the optical core extending along a curved path; and
   an optical cladding at least on the transverse sides of the optical core;
   wherein the physical distribution of the optical cladding on the transverse sides of the optical core is asymmetric about the centre of the optical core;
   wherein the physical distribution of the optical cladding on the transverse sides of the optical core varies along the optical waveguide.

* * * * *